United States Patent
Takeyama

(10) Patent No.: US 8,765,309 B2
(45) Date of Patent: Jul. 1, 2014

(54) ELECTROCHEMICAL DEVICE

(75) Inventor: Tomoko Takeyama, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 811 days.

(21) Appl. No.: 12/961,635

(22) Filed: Dec. 7, 2010

(65) Prior Publication Data

US 2011/0143211 A1   Jun. 16, 2011

(30) Foreign Application Priority Data

Dec. 11, 2009  (JP) ................... 2009-281513

(51) Int. Cl.
*H01M 6/14*   (2006.01)

(52) U.S. Cl.
USPC ......................................... 429/302; 429/300

(58) Field of Classification Search
None
See application file for complete search history.

(56) References Cited

U.S. PATENT DOCUMENTS

2009/0253031 A1* 10/2009 Usui et al. .................... 429/111

FOREIGN PATENT DOCUMENTS

| JP | 11-185836 A | | 7/1999 |
|---|---|---|---|
| JP | 2004-151265 A | | 5/2004 |
| JP | 2007-016156 | * | 1/2007 |

OTHER PUBLICATIONS

Jakes, J. and Krimm, S. "A Valence Force Field for the Amide Group", Spectrochimica Acts, vol. 27A, 1971, pp. 19.

* cited by examiner

*Primary Examiner* — Milton I Cano
*Assistant Examiner* — Sarah A Slifka
(74) *Attorney, Agent, or Firm* — Cantor Colburn LLP

(57) ABSTRACT

Disclosed is an electrochemical device comprising a pair of electrodes and provided therebetween, a gelled nonaqueous electrolyte composition containing an electrolyte and a gelling agent having two or more amide groups in the chemical structure.

6 Claims, 1 Drawing Sheet

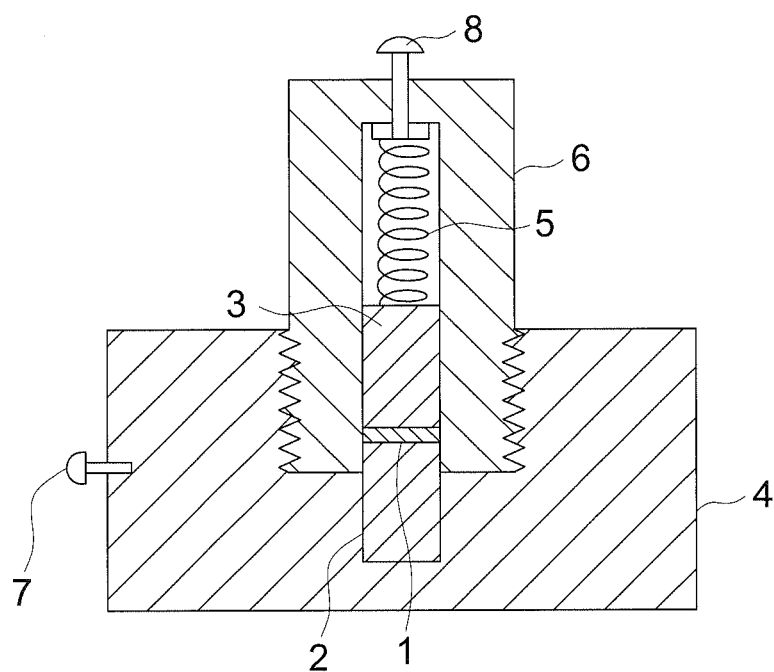
Prior Art

ELECTROCHEMICAL DEVICE

This application is based on Japanese Patent Application No. 2009-281513, filed on Dec. 11, 2009 in Japanese Patent Office, the entire content of which is hereby incorporated by reference.

FIELD OF THE INVENTION

This invention relates to an electrochemical device comprising a nonaqueous electrolyte composition between opposed electrodes.

TECHNICAL BACKGROUND

An electrochemical device comprising a nonaqueous electrolyte composition between opposed electrodes is used as a display device or a secondary battery. Such an electrochemical device has problem in the electrolyte composition used. A liquid electrolyte composition employing a nonaqueous solvent or an ionic liquid, although it is excellent in ion conductivity, has problem in that mechanical strength is poor and leaking of the liquid is likely to occur, resulting in poor handling property. Therefore, in order to overcome the problem, various attempts have been made in which the liquid electrolyte composition is added with materials such as a viscosity increasing agent or a gelling agent to be gelled or solidified. Particularly in a thin electrochemical device proposed in recent years, an electrolyte composition is required to be formed into a uniform film with high strength. However, when the strength of the film increases, migration of ions in the electrolyte composition tends to be inhibited, which results in lowering of the electrochemical reaction speed.

In order to solve the problem above, a gel electrolyte composition containing a gelling agent having a molecular weight of not more than 1000 has been proposed (disclosed, for example, in Japanese Patent O.P.I. Publication No. 11-185836). There is description therein that such a gel electrolyte composition provides a dye sensitization photoelectric conversion device or a photo-reproduction photo-electrochemical battery which excels in photoelectric conversion efficiency and in durability. However, it has proved that even the gel electrolyte composition has still problem in attaining both high electrochemical reaction efficiency and high film strength.

There is a general disclosure of solidification or gelation of an electrolyte composition of an electrochromic device in Japanese Patent O.P.I. Publication No. 2004-151265, however, there is no disclosure therein of effects other than the above effects of the solidification or gelation nor concrete embodiments.

In view of the above, a means has not been found hitherto to solve a problem in which performances vary due to variation of moisture content of an electrolyte composition particularly in an electrochemical device comprising the electrolyte composition.

SUMMARY OF THE INVENTION

The present invention has been made in view of the above. An object of the invention is to provide an electrochemical device, which comprises an electrolyte composition with high strength, suppresses lowering of electrochemical reaction speed, and reduces variation of performances due to variation of moisture content of the electrolyte composition. The electrochemical device of the invention comprises a pair of electrodes and provided therebetween, a nonaqueous electrolyte composition containing an electrolyte and a gelling agent having two or more amide groups in the chemical structure, wherein the nonaqueous electrolyte composition has been gelled by the gelling agent.

BRIEF DESCRIPTION OF THE DRAWINGS

FIG. 1 is a sectional side view of a measurement holder employed to measure ion conductivity.

DETAILED DESCRIPTION OF THE INVENTION

The above object of the invention can be attained by any one of the following constitutions.

1. An electrochemical device comprising a pair of electrodes and provided therebetween, a gelled nonaqueous electrolyte composition containing an electrolyte and a gelling agent having two or more amide groups in the chemical structure.
2. The electrochemical device of item 1 above, wherein the gelling agent further has at least one ring in the chemical structure.
3. The electrochemical device of item 2 above, wherein the ring of the gelling agent has a substituent comprising at least one amide group of the two or more amide groups.
4. The electrochemical device of item 3 above, wherein the substituent has no carbon atom between the amide group and the ring or has one carbon atom between the amide group and the ring.
5. The electrochemical device of item 3 above, wherein the substituent has the amide group on the end thereof; the amide group being represented by —CONHRx or —NHCORy, in which Rx and Ry represent an alkyl group having a carbon atom number of not less than 2.
6. The electrochemical device of item 5 above, wherein the alkyl group has a carbon atom number of from 2 to 22.
7. The electrochemical device of item 6 above, wherein the alkyl group has a carbon atom number of from 5 to 12.
8. The electrochemical device of any one of items 1 through 7 above, wherein the gelled nonaqueous electrolyte composition further contains an ionic liquid.
9. The electrochemical device of any one of items 1 through 8 above, wherein the gelled nonaqueous electrolyte composition further contains fillers.
10. The electrochemical device of item 9 above, wherein the fillers are basic inorganic particles.
11. The electrochemical device of any one of items 1 through 10 above, wherein the gelling agent is a compound represented by formula (7) or (10) each described later.
12. The electrochemical device of any one of items 1 through 10 above, wherein the gelling agent further has a siloxane bond in the chemical structure.
13. The electrochemical device of item 12 above, wherein the gelling agent is a compound represented by formula (A), (B) or (C) each described later.
14. The electrochemical device of any one of items 1 through 13 above, wherein the electrochemical device is employed as a display device.
15. The electrochemical device of any one of items 1 through 13 above, wherein the electrochemical device is employed as a secondary battery.

Next, the preferred embodiment of the invention will be explained in detail

The present inventor has found that an electrochemical device, which comprises at least a pair of electrodes and provided therebetween, a gelled nonaqueous electrolyte composition containing an electrolyte and a gelling agent having in the chemical structure two or more amide groups, wherein the nonaqueous electrolyte composition is gelled by the gelling agent, provides an electrolyte composition with high strength, suppresses lowering of electrochemical reaction speed, and reduces variation of performances due to variation of moisture content of the electrolyte composition, and have completed the invention.

Next, the typical constituent of the invention will be explained.

[Electrolyte]

The electrochemical device of the invention is characterized in that it comprises a pair of electrodes and a nonaqueous electrolyte composition containing an electrolyte and a gelling agent between the pair of electrodes, the nonaqueous electrolyte composition having been gelled.

In the invention, the electrolyte implies a compound which is dissociated into a cation and an anion in the solution.

As the electrolyte used in the invention, salts, acids and alkalis conventionally used in the electrochemical field or in the battery field can be used.

The salts are not specifically limited and examples thereof include an inorganic ion-containing salt such as an alkali metal salt or an alkali earth metal salt, a quaternary ammonium salt, a cyclic quaternary ammonium salt and a quaternary phosphonium salt.

Examples of the salts include a lithium salt, a sodium salt or a potassium salt containing a counter anion selected from a halogen ion, $SCN^-$, $ClO_4^-$, $BF_4^-$, $CF_3SO_3^-$, $(CF_3SO_2)_2N^-$, $(C_2F_5SO_2)_2N^-$, $PF_6^-$, $AsF_6^-$, $CH_3COO^-$, $CH_3(C_6H_4)SO_3^-$, and $(C_2F_5SO_2)_3C^-$.

Further, examples of the salts include a quaternary ammonium salt containing a counter anion selected from a halogen ion, $SCN^-$, $ClO_4^-$, $BF_4^-$, $CF_3SO_3^-$, $(CF_3SO_2)_2N^-$, $(C_2F_5SO_2)_2N^-$, $PF_6^-$, $AsF_6^-$, $CH_3COO^-$, $CH_3(C_6H_4)SO_3^-$, and $(C_2F_5SO_2)_3C^-$. Typical examples of the quaternary ammonium salt include $(CH_3)_4NBF_4$, $(C_2H_5)_4NBF_4$, $(n-C_4H_9)_4NBF_4$, $(C_2H_5)_4NBr$, $(C_2H_5)_4NClO_4$, $(n-C_4H_9)_4NClO_4$, $CH_3(C_2H_5)_4NBF_4$, $(CH_3)_2(C_2H_5)_2NBF_4$, $(CH_3)_4NSO_3CF_3$, $(C_2H_5)_4NSO_3CF_3$, $(n-C_4H_9)_4NSO_3CF_3$, and the following compounds:

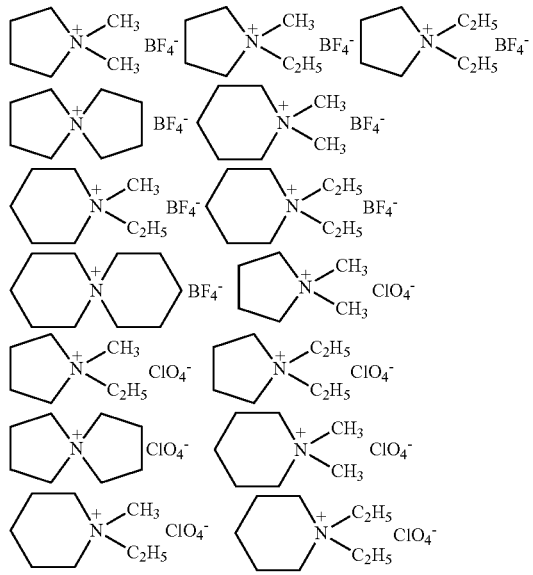

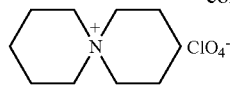

Further, examples of the salts include a quaternary phosphonium salt containing a counter anion selected from a halogen ion, $SCN^-$, $ClO_4^-$, $BF_4^-$, $CF_3SO_3^-$, $(CF_3SO_2)_2N^-$, $(C_2F_5SO_2)_2N^-$, $PF_6^-$, $AsF_6^-$, $CH_3COO^-$, $CH_3(C_6H_4)SO_3^-$, and $(C_2F_5SO_2)_3C^-$. Typical examples of the phosphonium ammonium salt include $(CH_3)_4PBF_4$, $(C_2H_5)_4PBF_4$, $(C_3H_7)_4PBF_4$, and $(C_4H_9)_4PBF_4$.

The salt described above can be suitably used in combination.

[Lithium Salt]

A lithium salt can be suitably used in the electrolyte in the invention.

Any lithium compound can be used as the lithium salt, and examples of an anion in the lithium salt include a halogen ion ($I^-$, $Cl^-$, $Br^-$, etc), $SCN^-$, $BF_4^-$, $PF_6^-$, $ClO_4^-$, $SbF_6^-$, $(CF_3SO_2)_2N^-$, $(CF_3CF_2SO_2)_2N^-$, $Ph_4B^-$, $(C_2H_4O_2)_2B^-$, $(CF_3SO_2)_3C^-$, $CF_3COO^-$, $CF_3SO_3^-$, and $C_6F_5SO_3^-$. The anion is preferably $SCN^-$, $BF_4^-$, $PF_6^-$, $ClO_4^-$, $SbF_6^-$, $(CF_3SO_2)_2N^-$, $(CF_3CF_2SO_2)_2N^-$, $(CF_3SO_2)_3C^-$, or $CF_3SO_3^-$.

Typical examples of the lithium salt include $LiN(CF_3SO_2)_2$, $LiCF_3SO_2$, $LiN(SO_2C_2F_5)_2$, $LiCF_3SO_3$, $LiPF_6$, $LiClO_4$, $LiI$, $LiBF_4$, $LiCF_3CO_2$, $LiSCN$ and $LiN(SO_2CF_3)_2$.

The addition amount of the electrolyte is optional, however, the upper limit of the electrolyte content in the electrolyte composition is ordinarily 20 mol/liter, preferably 10 mol/liter, and more preferably 5 mol/liter, and the lower limit of the electrolyte content in the solvent is ordinarily 0.01 mol/liter, preferably 0.05 mol/liter, and more preferably 0.1 mol/liter.

[Ionic Liquid]

An ionic liquid, which has ionic conductivity and is inflammable, can be suitably used in the electrolyte composition in the invention. In the invention, the ionic liquid preferably has a structure represented by formula (IL) below.

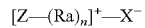    Formula (IL)

In formula (IL), Z represents N, S, P or a ring; Ra represents an organic substituent; and n is 3 or 4, provided that when Z represents N or P, n is 4, and when Z represents S, n is 3.

As the ring, there are mentioned a pyrrolidine ring, a piperidine ring, a morpholine ring, a tetrahydrothiophene ring, a 1-methylphosphorane ring and an imidazole ring. These rings may further have a substituent.

The substituent is not specifically limited. Examples of the substituent include an alkyl group (for example, a methyl group, an ethyl group, a hydroxyethyl group a stearoyl group, a dodecyl group, an eicosyl group, a docosyl group or an oleyl group); a cycloalkyl group (for example, a cyclopropyl group or a cyclohexyl group); an aryl group (for example, a phenyl group, a p-tetradecanyloxyphenyl group, an o-octadecanylaminophenyl group, a naphthyl group or a hydroxyphenyl group); a hydroxyl group; a carboxyl group; a nitro group; a trifluoromethyl group; an amide group (for example, an acetamide group or a benzamide group); a carbamoyl group (for example, a methylcarbamoyl group, a butylcarbamoyl group or a phenylcarbamoyl group); an ester group (for example, an ethyloxycarbonyl group i-propyloxycarbonyl group or a phenyloxycarbonyl group); a carbonyloxy group (for example, a methylcarbonyloxy group, a propylcarbonyloxy group or a phenylcarbonyloxy group); a cyano group; a halogen atom (for example, chlorine, bromine, iodine, fluorine); an alkoxy group (for example, a methoxy group, an ethoxy group or a butoxy group); an aryloxy group (for example, a phenoxy group or a naphthoxy group); a sulfonyl group (for example, a methanesulfonyl group or a p-toluene-suofonyl group); an alkylthio group (for example, a methylthio group, an ethylthio group, or a butylthio group); an arylthio group (for example, a phenylthio group); a sulfonamide group (for example, a methanesulfonamide group, a dodecylsulfonamide group or a p-toluenesulfonamide group); a sulfamoyl group (for example, a methylsulfamoyl group or a phenylsulfamoyl group); an amino group; an alkylamino group (for example, an ethylamino group, a dimethylamino group or a hydroxyethylamino group); and an arylamino group (for example, a phenylamino group or a naphthylamino group).

The organic group represented by Ra is not specifically limited. Examples of the organic group include an alkyl group (for example, a methyl group, an ethyl group, a hydroxyethyl group a stearoyl group, a dodecyl group, an eicosyl group, a docosyl group or an oleyl group); a cycloalkyl group (for example, a cyclopropyl group or a cyclohexyl group); an aryl group (for example, a phenyl group, a p-tetradecanyloxyphenyl group, an o-octadecanylaminophenyl group, a naphthyl group or a hydroxyphenyl group); a hydroxyl group; a carboxyl group; a nitro group; a trifluoromethyl group; an amide group (for example, an acetamide group or a benzamide group); a carbamoyl group (for example, a methylcarbamoyl group, a butylcarbamoyl group or a phenylcarbamoyl group); an ester group (for example, an ethyloxycarbonyl group i-propyloxycarbonyl group or a phenyloxycarbonyl group); a carbonyloxy group (for example, a methylcarbonyloxy group, a propylcarbonyloxy group or a phenylcarbonyloxy group); a cyano group; a halogen atom (for example, chlorine, bromine, iodine, fluorine); an alkoxy group (for example, a methoxy group, an ethoxy group or a butoxy group); an aryloxy group (for example, a phenoxy group or a naphthoxy group); a sulfonyl group (for example, a methanesulfonyl group or a p-toluenesuofonyl group); an alkylthio group (for example, a methylthio group, an ethylthio group, or a butylthio group); an arylthio group (for example, a phenylthio group); a sulfonamide group (for example, a methanesulfonamide group, a dodecylsulfonamide group or a p-toluenesulfonamide group); a sulfamoyl group (for example, a methylsulfamoyl group or a phenylsulfamoyl group); an amino group; an alkylamino group (for example, an ethylamino group, a dimethylamino group or a hydroxyethylamino group); and an arylamino group (for example, a phenylamino group or a naphthylamino group).

X represents $N(SO_2CF_3)_2$, $N(SO_2F)_2$, $N(CN)_2$ or $BF_3Y$ in which Y represents an alkyl group or a perfluoroalkyl group. Examples of the alkyl group include a methyl group, an ethyl group, a hydroxyethyl group a stearoyl group, a dodecyl group, an eicosyl group, a docosyl group or an oleyl group and examples of the perfluoroalkyl group include a trifluoromethyl group, a pentafluoroethyl group, a heptafluoropropyl group or a nonafluorobutyl group. Among these, X is preferably $N(SO_2F)_2$.

As the cationic component of the ionic liquid, there are mentioned 1-ethyl-3-methylimidazolium (EMI), N,N-diethyl-N-methyl-N-(2-methoxyethyl)ammonium (DEME), N-methyl-N-propylpyrrolidinium (P13) and N-methyl-N-propylpiperidinium (PP13).

As the anionic component of the ionic liquid, there are mentioned bis(fluoromethylsulfonyl)imide (FSI), bis(trifluoromethylsulfonyl)imide (TFSI), bis(pentafluoroethylsulfonyl)amide (BETI), tetrafluoroborate ($BF_3$) and hexafluorophosphate ($PF_6$).

However, the ionic liquid is not limited to a specific structure as long as it has a stable structure at a voltage falling within a voltage range under which a battery works.

[Gelling Agent]

Next, a gelling agent will be explained which is contained in the electrolyte composition in the invention.

Generally a state in which colloidal particles or a polymer solute loses the independent motion in a solution and aggregates to be solidified is called gel. A compound having a capability of changing a solution to the gel is called a gelling agent.

The electrochemical device of the invention is characterized in that the electrolyte composition has been gelled by a gelling agent having in the chemical structure two or more amide groups in the chemical structure.

In the invention, "a gelled nonaqueous electrolyte composition" means one having a mechanical strength of not less than 0.4 MPa. The mechanical strength herein refers to a minimum compression load necessary to fracture a gelled nonaqueous electrolyte composition. The minimum compression load is measured employing TENSILON TRC-1150A produced by ORIENTIC Co., Ltd., and an attachment device (a pair of compression plates) produced by ARAI SEISAKUSHO Co., Ltd., according to the following procedures:

1. A gelled nonaqueous electrolyte composition is applied onto a 150 μm thick releasing paper sheet TYPE SL produced by Sumitomo Kakoshi Co., Ltd., allowed to stand for 12 hours at 25° C. and at 60% RH, and cut into a sample in the cylindrical form with a diameter of 9 mm and a thickness of 5 mm to prepare a gelled nonaqueous electrolyte composition sample.

2. The resulting sample is provided between the pair of compression plates described above and compressed at 25° C. and at 60% RH in a compression direction in a compression speed of 0.5 mm/minute, while a compression load applied to the sample is monitored.

3. Then, the minimum compression load at which fracture occurs is measured. Herein, "fracture" means the state that a gelled nonaqueous electrolyte composition sample after application of compression load does not return to the original shape before application of compression load.

In the invention, the presence of a gelling agent having in the chemical structure at least two amide groups realizes an electrochemical device having an electrolyte composition with high strength, suppressing lowering of electrochemical reaction speed and reducing variation of performance due to variation of moisture content in the electrolyte composition. All of the mechanism is not clear, the following is supposed at the present.

That is, the presence of two or more amide groups in the gelling agent can form network structure among the gelling agents, and therefore, the gelling agent having two or more amide groups is considered to provide an electrolyte composition film with strength higher than a gelling agent having only one amide group. Unlikely a hard polymer, the network structure is supposed to show resistance to deformation, and increase resistance to pushing or bending force applied. With regard to the moisture content, it is presumed that the amido bond having moisture affinity traps moisture, thereby suppressing an influence of the moisture content in the electrolyte composition.

In the invention, the amide group refers to an organic functional group in which a carbonyl group is linked to a nitrogen atom, i.e., —CO—N— or —N—CO—.

In the invention, the gelling agent has two or more amide groups in the chemical structure. It is preferred that the gelling agent further has at least one ring in the chemical structure. It is also preferred that the ring of the gelling agent has a substituent comprising at least one amide group of the two or more amide groups. It is more preferred that the substituent on the ring above has no carbon atom between the amide group and the ring or has one carbon atom between the amide group and the ring. It is more preferred that the substituent on the ring above has the amide group on the end thereof, the amide group being represented by —CONHRx or —NHC-ORy, in which Rx and Ry represent an alkyl group having a carbon atom number of not less than 2, preferably from 2 to 22, and more preferably from 5 to 12.

As long as the gelling agent applicable to the invention has in the chemical structure two or more amide groups, it is not limited by another fundamental skeleton. Structural examples of the gelling agent applicable to the invention will be listed below, but the invention is not specifically limited thereto.

As a first example of the gelling agent applicable to the invention, a benzyloxycarbonylamino acid derivative represented by formula (1) is mentioned.

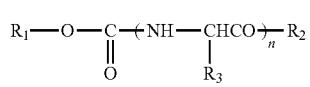

Formula (1)

In formula (1) above, $R_1$ represents a substituted or unsubstituted benzyl group; $R_2$ represents an alkylamino group having a carbon atom number of from 6 to 22, an alkenylamino group having a carbon atom number of from 6 to 22, a substituted or unsubstituted alkylcarbonylphenoxy group having a carbon atom number of from 6 to 22 or a substituted or unsubstituted alkenylcarbonylphenoxy group having a carbon atom number of from 6 to 22, $R_3$ represents a straight-chained or branched alkyl group having a carbon atom number of from 1 to 4; and n is an integer of from 1 to 4, provided that when n is 1, $R_2$ is an alkylamino group having a carbon atom number of from 6 to 22 or an alkenylamino group having a carbon atom number of from 6 to 22, and when $R_2$ represents an alkylamino group having a carbon atom number of from 6 to 22 or an alkenylamino group having a carbon atom number of from 6 to 22, n is not 1.

Typical examples of the compound represented by formula (1) above will be listed below.

Compound 1-1

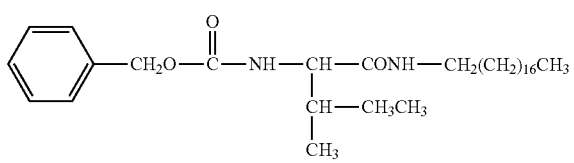

Compound 1-2

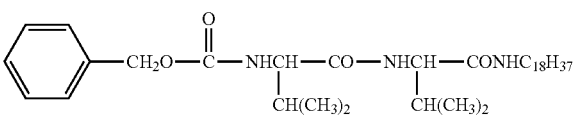

As a second example of the gelling agent applicable to the invention, an oligopeptide alkylamide derivative represented by formula (2) is mentioned.

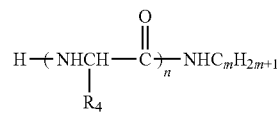

Formula (2)

In formula (2) above, $R_4$ represents a straight-chained or branched alkyl group having a carbon atom number of from 1 to 4, which may have a phenyl group, an alkyloxycarbonyl group or a benzyloxycarbonyl group; m represents an integer of from 1 to 22; and n represents an integer of from 2 to 30.

Examples of the compound represented by formula (2) above include pentavaline stearyl amide (Compound 2-1), pentaphenylalanine laurylamide (Compound 2-2), penta(m-ethyl glutamate) propylamide (Compound 2-3), tetra(ethyl glutamate) propylamide (Compound 2-4), hexa(ethyl glutamate) hexylamide (Compound 2-5), penta(ethyl glutamate) laurylamide (Compound 2-6), penta(ethyl glutamate) stearylamide (Compound 2-7), deca(ethyl glutamate) stearylamide (Compound 2-8), dodeca(ethyl glutamate) stearylamide (Compound 2-9), tetra(phenyl glutamate) laurylamide (Compound 2-10), and tridecane (ethyl glutamate) laurylamide (Compound 2-11).

The chemical structures of the compounds described above will be shown below.

Compound 2-1

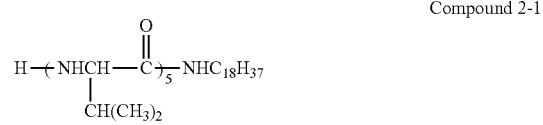

Compound 2-2

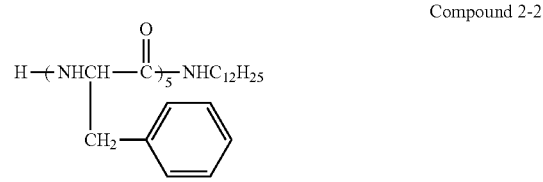

Compound 2-3

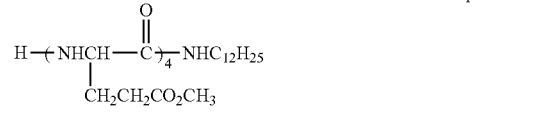

Compound 2-4

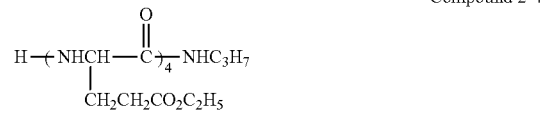

Compound 2-5

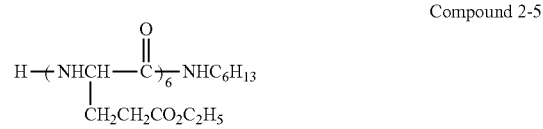

Compound 2-6

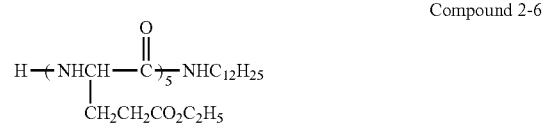

Compound 2-7

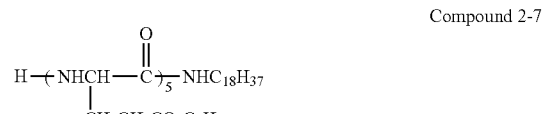

Compound 2-8

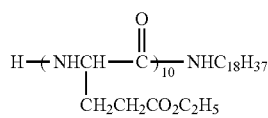

Compound 2-9

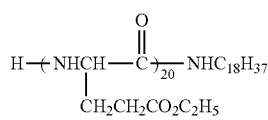

Compound 2-10

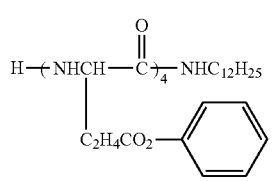

Compound 2-11

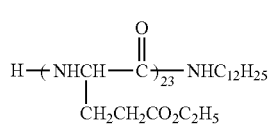

As a third example of the gelling agent applicable to the invention, an isoleucine derivative represented by formula (3) is mentioned.

Formula (3)

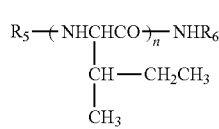

In formula (3) above, $R_4$ and $R_4$ independently represent a straight-chained or branched alkyl group having a carbon atom number of from 1 to 4, which may have a phenyl group, an alkyloxycarbonyl group or a benzyloxycarbonyl group; and n represents an integer of from 2 to 30.

Typical examples of the isoleucine derivative represented by formula (3) above include N-(benzyloxycarbonyl)isoleucine stearyl amide (Compound 3-1), N-(benzyloxycarbonyl) isoleucine lauryl amide (Compound 3-2), and pentaisoleucine stearyl amide (Compound 3-3). The chemical structures of the derivatives described above will be shown below.

Compound 3-1

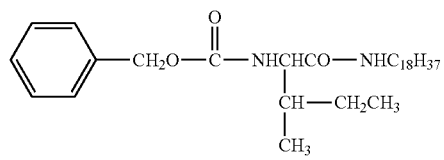

Compound 3-2

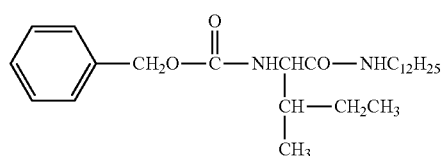

Compound 3-3

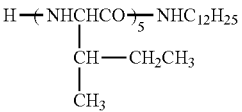

As another gelling agent applicable to the invention, there are mentioned an alkylamide derivative of an oligoamino acid with a monoallylamine represented by formula (4), an N-α-alkyl or alkenylcarbamoyl-N-ω-acylamino acid ester compound represented by formula (5), a polymetizable functional group-containing alkyleneamide derivative represented by formula (6), a cyclohexane alkylurea derivative represented by formula (7) such as 1,2-bis(stearylaminocarbonylamino) cyclohexane, a cyclohexane derivative represented by formula (8), a benzene carboxylic acid amide compound represented by formula (9) or (10), an aspartic acid phenylalanine cyclodipeptide derivative represented by formula (11), a cyclodipeptide derivative represented by formula (12), a cyclodipeptide represented by formula (13), (14), (15) or (16) and a compound represented by formula (17), (18), (19), (20), (21) or (22), each being described later.

Next, the gelling agents represented by formula (4) through (22) will be explained.

Firstly, the alkylamide derivative of an oligoamino acid with a monoalkylamine represented by the following formula (4) will be explained.

Formula (4)

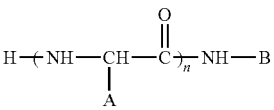

In formula (4) above, n represents an integer of from 2 through 30; A represents $(CH_2)_2$—COOH, $(CH_2)_2$—COOR, $CH(CH_3)_2$, $CH_2CH(CH_3)_2$, $CH(CH_3)C_2H_5$, or $CH_2(Phe)$, in which R represents an alkyl group having a carbon atom number of from 1 to 22, a phenyl group or a benzyl group and Phe represents a phenyl group; and B represents a straight chained or branched alkyl group having a carbon atom number of from 1 to 20.

Next, the N-α-alkyl or alkenylcarbamoyl-N-ω-acylamino acid ester compound represented by formula (5) will be explained.

Formula (5)

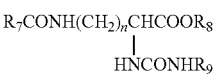

In formula (5) above, $R_7$ represents a straight chained or branched alkyl or alkenyl group having a carbon atom number of from 7 to 21; $R_8$ represents a straight chained, branched or cyclic alkyl or alkenyl group having a carbon atom number of from 7 to 21; $R_9$ represents a straight chained or branched allyl, alkenyl or cyclic group having a carbon atom number of from 8 to 22; and n represents an integer of from 2 through 4.

Next, the polymerizable functional group-containing alkylene amide derivative represented by formula (6) will be explained.

Formula (6)

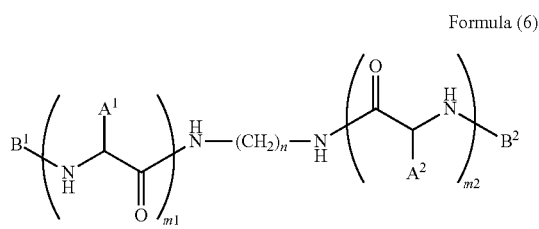

In formula (6) above, n represents an integer of from 2 to 30; $A^1$ and $A^2$ independently represent —$(CH_2)_2COOR$ (in which R represents a hydrogen atom, an alkyl group having a carbon atom number of from 1 to 22, a phenyl group or a benzyl group), —$CH(CH_3)_2$, —$CH_2CH(CH_3)_2$, —$CH(CH_3)C_2H_5$, or —$CH_2C_6H_5$, and may be the same or different; $B^1$ and $B^2$ independently represent an alkyl group or a vinyl group-containing group selected from —$CONH(CH_2)_2OCOC(CH_3)=CH_2$, —$COC(CH_3)=CH_2$ and —$COCH=CH_2$ a hydrogen atom; provided that at least one of $B^1$ and $B^2$ is the vinyl group-containing group, and when both of $B^1$ and $B^2$ are the vinyl group-containing group, $B^1$ and $B^2$ may be the same or different hydrogen atom; and $m_1$ and $m_2$ independently represent an integer of 1 or 2.

Next, the cyclohexane alkylurea derivative represented by formula (7) such as 1,2-bis(stearylaminocarbonylamino)cyclohexane will be explained.

Formula (7)

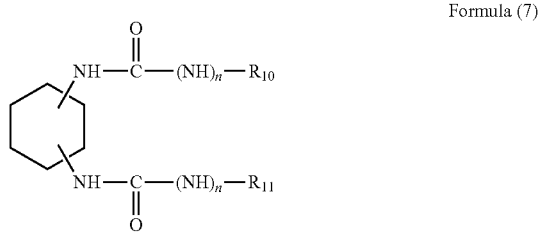

In formula (7) above, $R_{11}$ and $R_{12}$ independently represent a saturated straight chained or saturated branched alkyl group having a carbon atom number of from 1 to 18; and n represents an integer of 0 or 1.

Typical examples of the compound represented by formula (7) will be listed below.

Compound 7-1

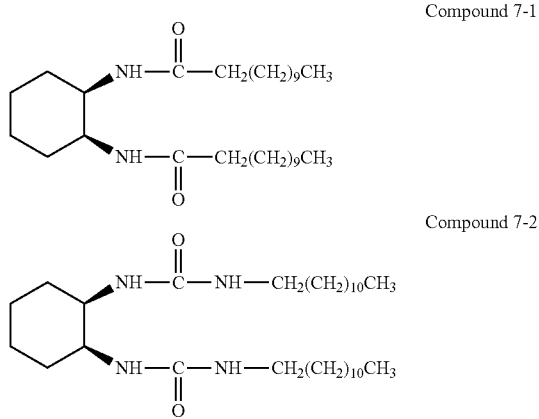

Compound 7-2

Compound 7-3

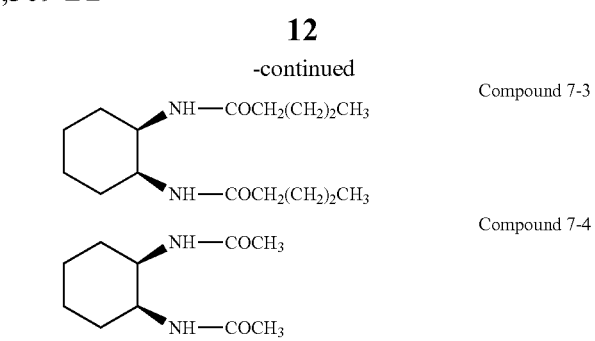

Compound 7-4

Next, the cyclohexane derivative represented by formula (8) will be explained.

Formula (8)

In formula (8) above, $R_{12}$ and $R_{13}$ may be the same or different, and independently represent an alkyl group having a carbon atom number of from 8 to 20.

Next, the benzene carboxylic acid amide compound represented by formula (9) will be explained.

Formula (9)

In formula (8) above, $X^1$ and $X^2$ independently represent -AA-NHR in which AA represents an amino acid acyl group and R represents an alkyl group having a carbon atom number of from 8 to 22; and n represents an integer of 1 or 2.

Typical examples of the compound represented by formula (9) In formula (8) above include those disclosed in paragraphs (0015) through (0020) of Japanese Patent O.P.I. Publication No. 2000-72736.

Next, the benzene carboxylic acid amide compound represented by formula (10) will be explained.

Formula (10)

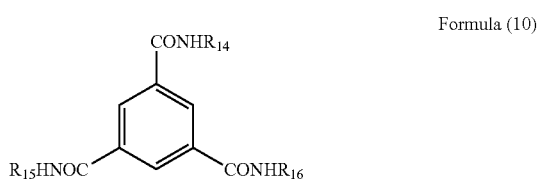

In formula (10) above, $R_{14}$, $R_{15}$ and $R_{16}$ independently represent a straight chained or branched alkyl or alkenyl group having a carbon atom number of from 8 to 22, which may contain a cyclic ring.

Typical examples of the compound represented by formula (10) include 1,3,5-tris{[N-(3,7-dimethyloctyl)amino]carbonyl}benzene (Compound 10-1), 1,3,5-tris[(N-laurylamino)carbonyl]benzene (Compound 10-2), and 1,3,5-tris[(N-stearylamino)carbonyl]benzene (Compound 10-3). The chemical structures of those compounds will be shown below.

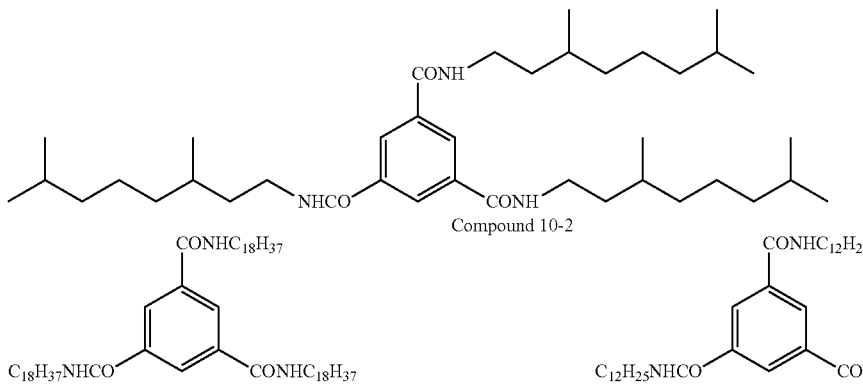

Compound 10-1

Compound 10-2

Compound 10-3

Next, the aspartic acid phenylalanine cyclodipeptide derivative represented by formula (11) will be explained.

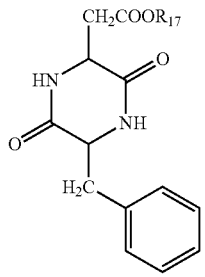

Formula (11)

In formula (11) above, $R_{17}$ represents an alkyl or alkenyl group having a carbon atom number of from 6 to 22, each having at least one of a straight chained structure, a branched structure and a ring structure.

Typical examples of the compound represented by formula (9) above include cyclo(L-β-dimethyloctylaspartyl-L-phenylalanyl) (Compound 11-1), cyclo(L-β-laurylaspartyl-L-phenylalanyl) (Compound 11-2), cyclo(L-β-stearylaspatyl-L-phenylalanyl) (Compound 11-3), cyclo(L-β-oleylaspatyl-L-phenylalanyl) (Compound 11-4), cyclo(L-β-isooctylaspatyl-L-phenylalanyl) (Compound 11-5), cyclo(L-β-cyclohexylaspatyl-L-phenylalanyl) (Compound 11-6), and cyclo(L-β-behenylaspatyl-L-phenylalanyl) (Compound 11-7). Among these, Compounds 11-1 through 11-3 are especially preferred.

Next, the cyclodipeptide derivative represented by formula (12) will be explained.

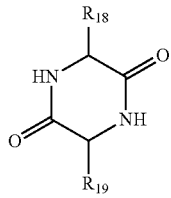

Formula (12)

In formula (12) above, $R_{18}$ represents a hydrogen atom, an alkyl group having a carbon atom number of from 1 to 4, or a benzyl group; and $R_{19}$ represents an alkyl group having a carbon atom number of from 1 to 4, which may have an alkyloxycarbonyl group having a carbon atom number of from 3 to 22 or an alkenyloxycarbonyl group having a carbon atom number of from 3 to 22.

Typical examples of the compound represented by formula (12) will be listed below.

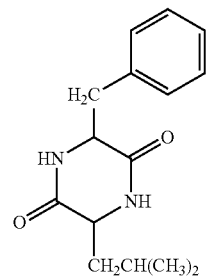

Compound 12-1

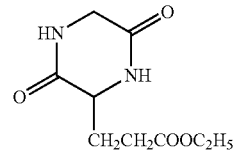

Compound 12-2

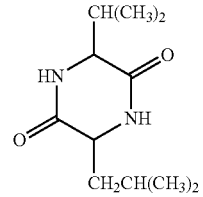

Compound 12-3

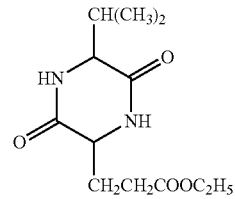

Compound 12-4

-continued

Compound 12-5

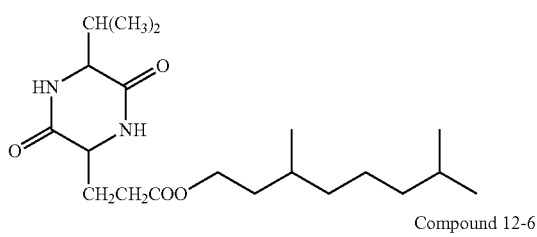

Compound 12-6

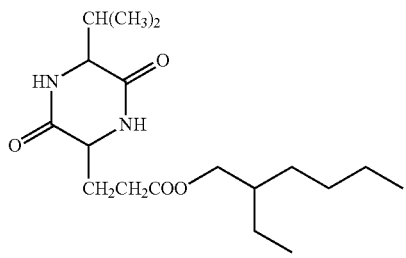

Compound 12-7

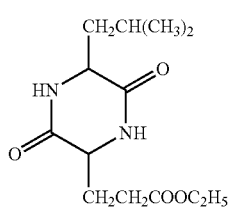

Next, the cyclodipeptide represented by formula (13), (14), (15) or (16) will be explained.

Formula (13)

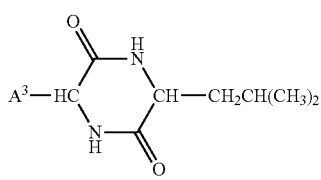

In formula (13) above, $A^3$ represents $(CH_3)_2CH$, $(CH_3)_2CHCH_2$, $(C_2H_5)(CH_3)CH$, or

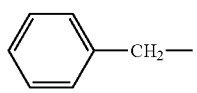

Typical examples of the compound represented by formula (13) above and the synthesis method thereof are referred to those disclosed in Japanese Patent No. 2921730.

Formula (14)

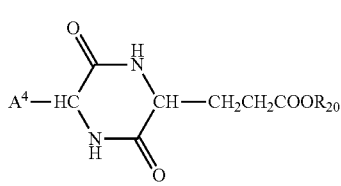

In formula (14) above, $A^4$ represents a hydrogen atom, $CH_3$, $(CH_3)_2CH$, $(CH_3)_2CHCH_2$, $(C_2H_5)(CH_3)CH$, or

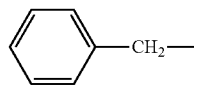

$R_{20}$ represents a hydrogen atom or a straight chained or branched alkyl group having a carbon atom number of from 1 to 22.

Formula (15)

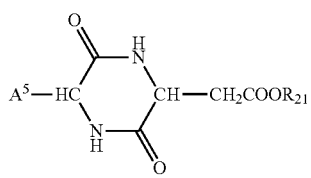

In formula (15) above, $A^S$ represents a hydrogen atom, $CH_3$, $(CH_3)_2CH$, $(CH_3)_2CHCH_2$, $(C_2H_5)(CH_3)CH$, or

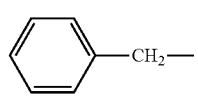

$R_{21}$ represents a hydrogen atom or a straight chained or branched alkyl group having a carbon atom number of from 1 to 22.

Formula (16)

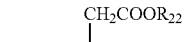

In formula (16) above, $R_R$, represents a straight chained or branched alkyl or alkenyl group having a Carbon atom number of from 8 to 22, which can contain a cyclic ring.

Typical examples of the compound represented by formula (16) above include cyclo(L-β-dimethyloctylaspartyl-L-phenylalanyl) (Compound 16-1), cyclo(L-β-laurylaspartyl-L-phenylalanyl) (Compound 16-2), and cyclo(L-β-stearylaspatyl-L-phenylalanyl) (Compound 16-3), and the chemical structures thereof will be shown below.

Compound 16-1

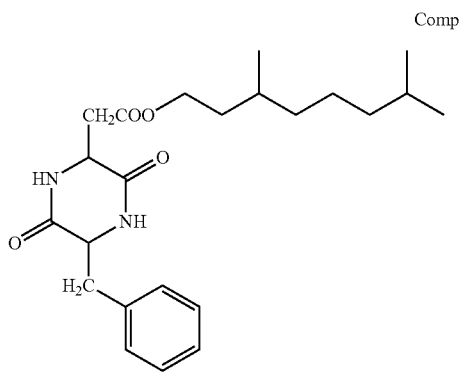

Compound 17-1

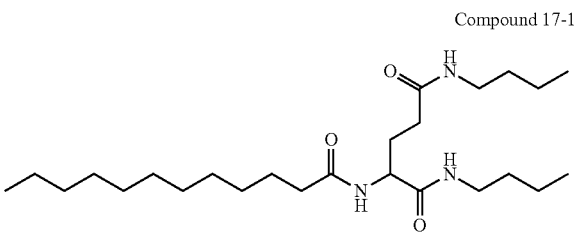 [SMILES: CCCCCCCCCCCC(=O)NC(CCC(=O)NCCCC)C(=O)NCCCC]

Next, the compound represented by formula (18) will be explained.

Compound 16-2

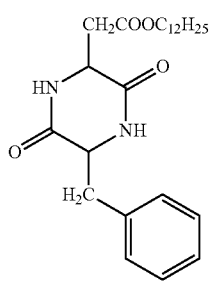

Formula (18)

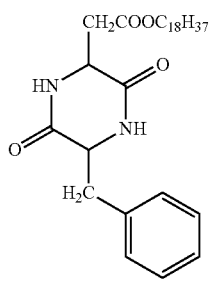

Compound 16-3

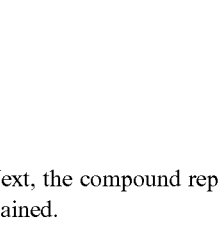

In formula (18) above, $R_{26}$ and $R_{27}$ may be the same or different, and independently represent an alkyl group or an aryl group.

Typical examples of the compound represented by formula (18) include Compound 18-1 as shown below.

Compound 18-1

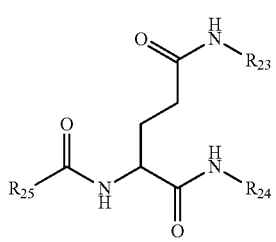

Next, the compound represented by formula (17) will be explained.

Next, the compound represented by formula (19) will be explained.

Formula (17)

Formula (19)

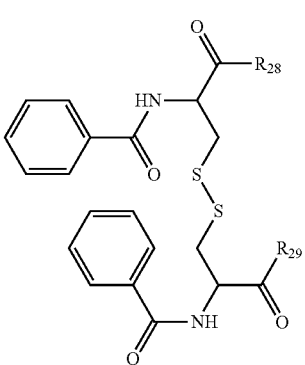

In formula (17) above, $R_{23}$, $R_{24}$ and $R_{25}$ may be the same or different, and independently represent an alkyl group or an aryl group.

Typical examples of the compound represented by formula (17) include Compound 17-1 shown below.

In formula (19) above, $R_{28}$ and $R_{29}$ may be the same or different, and independently represent an alkyl group or an aryl group.

Next, the compound represented by formula (20) will be explained.

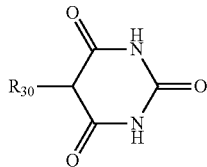

Formula (20)

In formula (20) above, $R_{30}$ represents an alkyl group or an aryl group.

Typical examples of the compound represented by formula (20) include Compound 20-1 as shown below.

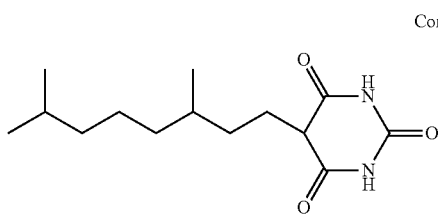

Compound 20-1

Next, the compound represented by formula (21) will be explained.

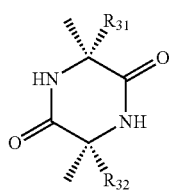

Formula (21)

In formula (21) above, $R_{31}$ and $R_{32}$ may be the same or different, and independently represent alkyl group or an aryl group.

Next, the compound represented by formula (22) will be explained.

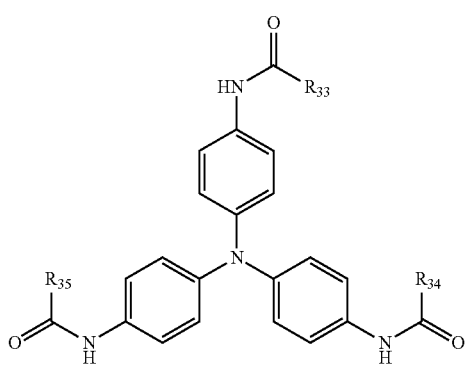

Formula (22)

In formula (22) above, $R_{33}$, $R_{34}$ and $R_{35}$ may be the same or different, and independently represent an alkyl group or an aryl group.

Among the compounds represented by formulae (1) through (22), those having a ring in the chemical structure are preferred in providing good gel uniformity and good gel strength, and those having an amide group in the side chain is especially preferred in suppressing lowering of reaction speed. Those having an alkyl chain with an appropriate length are stable. Further, those comprising a ring in which the distance between the ring and the amide group is not large are preferred. Among those, a compound represented by formula (7) or (10) above is especially preferred.

It is preferred that the gelling agent in the invention further has a siloxane bond, since the gelling agent is fixed to the fillers. That is, the siloxane bond-containing gelling agent such as a siloxane polymer containing an amino acid derivative segment is preferred in that when the electrolyte composition contains fillers, the gelling agent is fixed onto the fillers through the siloxane bond, resulting in an increase in strength of the electrolyte composition.

Next, as the siloxane bond-containing gelling agent applicable to the invention, siloxane bond-containing gelling agents represented by formula (A) to (C) will be explained.

At first, a compound represented by the following formula (A) will be explained.

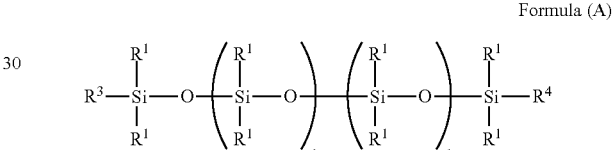

Formula (A)

In formula (A) above, plural $R^1$s independently represent a straight chained alkoxy group having a carbon atom number of from 1 to 12, a substituted or unsubstituted alkyl group having a carbon atom number of from 1 to 18, an aralkyl group having a carbon atom number of from 7 to 21 or a substituted or unsubstituted aryl group having a carbon atom number of from 6 to 20; $R^2$ represents an amino acid derivative segment represented by the following formula (D),

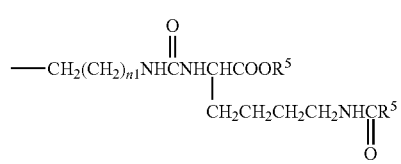

Formula (D)

wherein n1 represents an integer of from 1 to 15, and plural $R^5$s independently represent a substituted or unsubstituted alkyl group having a carbon atom number of from 1 to 22; $R^3$ and $R^4$ represent the same as those denoted above in any of $R^1$s and $R^2$; X1 represents an integer of from 0 to 500; and y1 represents an integer of from 0 to 400, provided that when Y1 is 0, at least one of $R^3$ and $R^4$ represents the amino acid derivative segment represented by formula (D) above.

Next, a compound represented by the following formula (B) will be explained.

Formula (B)

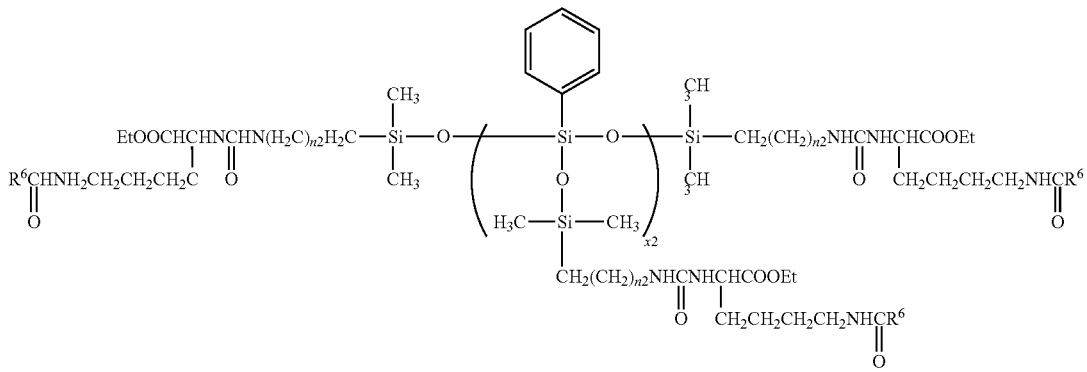

In formula (B) above, plural $R^6$s independently represent a substituted or unsubstituted alkyl group having a carbon atom number of from 1 to 22; X2 represents an integer of from 1 to 500; and n2 represents an integer of from 1 to 15.

Next, a compound represented by the following formula (C) will be explained.

Formula (C)

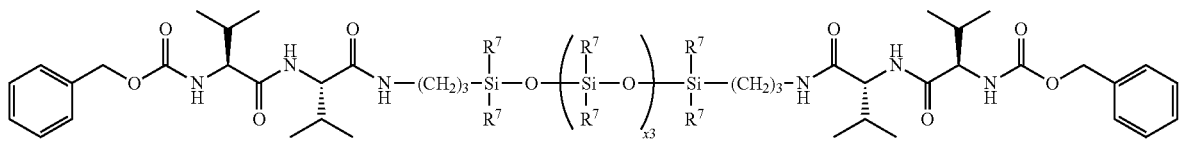

In formula (C) above, plural $R^7$s independently represent a straight chained alkoxy group having a carbon atom number of from 1 to 22, a substituted or unsubstituted alkyl group having a carbon atom number of from 1 to 18, an aralkyl group having a carbon atom number of from 7 to 21 or a substituted or unsubstituted aryl group having a carbon atom number of from 6 to 20; and X3 represents an integer of from 0 to 500.

[Fillers]

In the electrochemical device of the invention, it is preferred that the nonaqueous electrolyte composition in the invention contains fillers. The fillers used in the nonaqueous electrolyte composition of the invention are preferably inorganic particles.

<White Inorganic Particles>

When the electrochemical device of the invention is a display device, use of white inorganic particles can display white effectively.

Examples of the white particles used in the invention include, for example, particles of titanium dioxide (anatase or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metal salts, talc, kaolin, zeolite, acid clay, and glass. These particles may be used individually or in combination.

Among the above white particles, titanium dioxide is preferably used. Particularly, titanium dioxide surface-treated with an inorganic oxide (e.g., $Al_2O_3$, AlO(OH) or $SiO_2$) or titanium dioxide which is further treated, in addition to the above surface treatment, with an organic compound such as trimethylol ethane, triethanolamine acetate or trimethylcyclosilane are more preferably used.

<Basic Inorganic Particles>

When the electrochemical device of the invention is a secondary battery, the fillers are preferably basic inorganic particles.

The basic inorganic particles applicable to the invention may be those which have Bronsted basic sites, Lewis basic sites or both of them. The Bronsted basic sites are sites accepting H+, and the Lewis basic sites are sites accepting electron pairs.

As a measure representing Lewis basicity, a doner number, which represents electron donating capability, can be used. The doner number is determined by measuring the heat of reaction in the following equilibrium reaction:

$$D + SbCl_5 \leftrightarrow D^+ - SbCl_5$$

wherein D represents the basic inorganic particles in the invention.

In the invention, a Lewis basic compound is one having a doner number of 10 or more.

Examples of the basic inorganic particles in the invention include particles of sodium oxide, potassium oxide, magnesium oxide, calcium oxide, barium oxide, lanthanum oxide, cerium oxide, zinc oxide, strintium oxide, vanadium oxide, aluminum oxide, $SiO_2$—MgO, $SiO_2$—CaO, $Al_2O_3$—MgO, zeolite (alkali metal ion-alkali earth metal ion exchange), hydrotalcite, sodium carbonate, potassium carbonate, magnesium carbonate, calcium carbonate, barium carbonate, lanthanum carbonate, cerium carbonate, and zinc carbonate. These particles may be used singly or in combination. Among these, magnesium oxide particles are preferred in view of high stability in an inonic liquid.

These basic inorganic particles are solid bases which are insoluble in an ionic liquid.

As a first effect, these basic inorganic particles trap corrosive gases generated on decomposition of an ionic liquid in a battery, thereby improving the battery lifetime. As a second effect, an inorganic oxide having a strong lewis basicity such as magnesium oxide is expected to improve a lithium ion transport number in an ionic liquid. This reason is considered to be because an organic cation present in an ionic liquid is preferentially trapped by the basic groups located on the surface of the basic inorganic particles, resulting in increase of the lithium ion transport number.

The basic inorganic particles having an average particle diameter of from 100 nm to 1 μm are preferred in that their dispersion stability in the nonaqueous electrolyte is high. Herein, the average particle diameter is an average of diameter (sphere conversion particle diameter) of spheres having the same volume as primary particles or their aggregates, and the average can be determined via an electron micrograph.

Specifically, the average sphere conversion particle diameter can be determined employing the image processing program attached to a transmission electron microscope (TEM 2010F) produced by Nippon Denshi Co., Ltd. That is, after taking a transmission electron micrograph of the particles, at least 200 particles in a given viewing field range are measured to determine the sphere conversion particle diameter of each particle, and an average thereof is determined, thereby obtaining the average sphere conversion particle diameter. The basic inorganic particle content in the nonaqueous electrolyte is preferably from 1 to 30% by weight. The above basic inorganic particle content range improves the lifetime of the battery. The ionic liquid gels in the presence of the inorganic particles, and when used in a battery, prevents leaking of the liquid.

The surface of the basic inorganic particles may be subjected to hydrophobic processing. Examples of the hydrophobic processing agent include hexamethyldisilazane, trimethylmethoxysilane, trimethylethoxysilane and trimethylsilylchloride. As the surface processing method, there are a dry method in which the surface processing agent is directly sprayed to the particles and heat-fixed; and a wet method in which the surface processing agent is added to the particles dispersed in a solution, and the wet method is preferred in that the particles are more uniformly dispersed. For example, as disclosed in Japanese Patent O.P.I. Publication No. 2007-264581, there is a surface processing method, in which the hydrophobic processing agent is added to the dispersion solution prepared according to a wet dispersion method. Thus, the particles processed employing the wet method are preferably used in view of high dispersibility.

[Solvent]

A solvent applicable to the nonaqueous electrolyte in the invention may be any as long as it can dissolve various kinds of compounds (except for fillers) which constitute the nonaqueous electrolyte in the invention.

Examples of such a solvent include nonaqueous solvents such as methanol, ethanol, tetrahydrofuran, ethylene carbonate, ethyl methyl carbonate, diethyl carbonate, dimethyl carbonate, butylene carbonate, propylene carbonate, nitromethane, acetonitrile, acetylacetone, N-methylformamide, N,N-dimethylformamide, dimethyl sulfoxide, hexamethylphosphonamide, dimethoxyethane, diethoxyfurane, γ-butyrolactone, γ-valerolactone, sulfolane, propionitrile, butyronitrile, glutaronitrile, adiponitrile, methoxyacetonitrile, N-methylacetoamide, N,N-dimethylacetoamide, N-methylpropionamide, methylpyrrolidinone, 2-(N-methyl)-2-pyrrolidinone, dimethyl sulfoxide, dioxolane, trimethyl phosphate, triethyl phosphate, tripropyl phosphate, ethyldimethyl phosphate, tributyl phosphate, tripentyl phosphate, trihexyl phosphate, triheptyl phosphate, trioctyl phosphate, trinonyl phosphate, tridecyl phosphate, tis(trifluoromethyl) phosphate, tris(pentafluoroethyl) phosphate, triphenyl phosphate, tricresyl phosphate, 2-ethylhexyl phosphate, tetramethylurea, 1,3-dimethyl-2-imidazolidinone, hexamethylphosphoric triamide, 4-methyl-2-pentanone, dioctyl phthalate, dioctyl sebacate, and polyethylene glycols such as ethylene glycol, diethylene glycol, and triethylene glycol.

Among the solvents described above, aprotic polar solvents are preferred, and propylene carbonate, ethylene carbonate, dimethylsulfoxide, dimethoxyethane, acetonitrile, γ-butyrolactone, sulfolane, dioxolane, dimethylformamide, dimethoxyethane, tetrahydrofuran, adiponitrile, methoxyacetonitrile, dimethylacetoamide, methylpyrrolidinone, dimethylsulfoxide, dioxolane, sulfolane, trimethyl phosphate, and triethyl phosphate are especially preferred. These solvents may be used singly or as an admixture of two or more kinds thereof.

[Electrode]

The electrochemical device of the invention is characterized in that it comprises at least a pair of electrodes and a nonaqueous electrolyte composition provided between the pair of electrodes.

Electrode materials used in the electrodes in the invention are not particularly limited as long as they are electrically conductive. Examples of the electrode materials include metals such as platinum, gold, silver, copper, aluminum, zinc, nickel, titanium, bismuth and alloys thereof, carbon, indium tin oxide (ITO), indium zinc oxide (IZO), fluorine-doped tin oxide (PTO), indium oxide, zinc oxide, rhodium, chromium, carbon, aluminum, silicon, amorphous silicon, and BSO (bismuth silicon oxide), polythiophene, polypyrrole, polyacetylene, polyparaphenylene, polyselenophenylene, and their modification compound. These materials may be used singly or in combination.

In the invention, when the electrochemical device is a display device, at least one electrode (electrode on a viewer side) is preferably transparent.

[Substrate]

As a substrate applicable to the electrochemical device of the invention, there are mentioned known various kinds of substrates such as substrates of glass, metal, ceramic, resin and the like.

Examples of a transparent substrate used in the display device include a film or plate of polymers such as polyester (for example, polyethylen terephthalate and the like), polyimide, polymethyl methacrylate, polystyrene, polypropylene, polyethylene, polyimide, nylon, polyvinyl chloride, polyvinylidene chloride, polycarbonate, polyether sulfone, silicone resin, polyacetal resin, fluorine-contg resin, cellulose derivatives or polyolefin, and a glass substrate.

The substrate in the invention comprises the substrate described above on which a functional layer such as an isulation layer or a conductive layer including an electrode is provided.

[Constitution of Display Device]

A display device is one of the preferred embodiments of the electrochemical device of the invention. Next, constitution of the display device in the invention will be explained.

(Electrochromic Compound)

Application of an electrochromic compound (hereinafter also referred to as EC compound) varying its color on electrochemical reaction in the electrochemical device of the invention provides a display device according to an electrochromic process.

The electrochromic compound used in the invention is not specifically limited as long as it colors or discolors on at least one reaction of electrochemical oxidation and reduction reactions, and can be appropriately selected in accordance with an intended object. Examples of the EC compound include an inorganic compound such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride or zirconium nitride chloride; an organic complex; a conductive polymer and an organic dye.

As an organic complex exhibiting an electrochromic property, there are mentioned a metal-bipyridyl complex, a metal phenanthroline complex, a metal phthalocyanine complex, a rare earth element diphthalocyanine complex, and a ferrocene dye.

As a conductive polymer exhibiting an electrochromic property, there are mentioned polypyrrol, polythiophene, polyisothianaphthene, polyaniline, polyphenylene diamine, polybenzidine, polyamino phenol, polyvinyl carbazole, polycarbazole and their derivatives.

Further, a polymer material composed of a bis-terpyridine derivative and a metal ion as disclosed in Japanese Patent O.P.I. Publication No. 2007-112957 exhibits an electrochromic property.

Examples of the organic dye exhibiting an electrochromic property include a pyridinium compound such as viologen, an azine dye such as phenothiazine, a styryl dye, an anthraquinone dye, a pyrazoline dye, a fluoran dye, and a doner/acceptor type compound (such as tetracyanoquinodimetahne or tetrathiafulvalene). Besides the above, a compound known as an oxidation-reduction indicator or a pH indicator can be also used.

Among these, an electrochromic compound, which is a leuco dye represented by formula (L) described later, is more preferred in view of coloration property and memory property

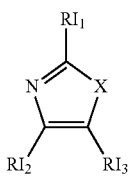

Formula (L)

In formula (L) above, $Rl_1$, represents a substituted or unsubstituted aryl group; $Rl_2$ and $Rl_3$ independently represent a hydrogen atom or a substituent, provided that $Rl_2$ and $Rl_3$ may combine with each other to form a ring; and X represents $>N-Rl_4$, an oxygen atom, a sulfur atom in which and $Rl_4$ represents a hydrogen atom or a substituent.

When $Rl_{1i}$ represents a substituted aryl group, the substituent is not specifically limited and examples thereof include the following groups: an alkyl group (for example, a methyl group, an ethyl group, a propyl group, an isopropyl group, a t-butyl group, a pentyl group, and a hexyl group), a cycloalkyl group (for example, a cyclohexyl group and a cyclopentyl group), an alkenyl group, a cycloalkenyl group, an alkynyl group (for example, a propargyl group), a glycidyl group, an acrylate group, a methacrylate group, an aromatic group (for example, a phenyl group, a naphthyl group, and an anthracenyl group), a heterocyclic ring group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a sulfolanyl group, a piperidinyl group, a pyrazolyl group, and a tetrazolyl group), an alkoxy group (for example, a methoxy group, an ethoxy group, a propyloxy group, a pentyloxy group, a cyclopentyloxy group, a hexyloxy group, and a cyclohexyloxy group), an aryloxy group (for example, a phenoxy group), an alkoxylcarbonyl group (for example, a methyloxycarbonyl group, an ethyloxycarbonyl group, and a butyloxycarbonyl group), an aryloxycarbonyl group (for example, a phenyloxycarbonyl group), a sulfonamide group (for example, a methane sulfonamide group, an ethane sulfonamide group, a butane sulfonamide group, a hexane sulfonamide group, a cyclohexane sulfonamide group, and a benzene sulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group, and a 2-pyridylaminosulfonyl group), a urethane group (for example, a methylureide group, an ethylureide group, a pentylureide group, a cyclohexylureide group, a phenylureide group, and a 2-pyridylureide group), an acyl group (for example, an acetyl group, a propionyl group, a butanoyl group, a hexanoyl group, a cyclohexanoyl group, a benzoyl group, and a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group, and a 2-pyridylaminocarbonyl group), an acylamino group (for example, an acetylamino group, a benzoylamino group, and a methylureide group), a sulfonyl group (for example, a methylsulfonyl group, an ethylsulfonyl group, a butylsulfonyl group, a cyclohexylsulfonyl group a phenylsulfonyl group, and a 2-pyridylsulfonyl group), an amino group (for example, an amino group, an ethylamino group, a dimethylamino group, a butylamino group, a cyclopentylamino group, an anilino group, and a 2-pyridylamino group), a halogen atom (for example, a chlorine atom, a bromine atom, and an iodine atom), a cyano group, a nitro group, a sulfo group, a carboxyl group, a hydroxyl group, and a phosphono group (for example, a phosphonoethyl group, a phosphonopropyl group, and a phosphonooxyethyl group). These groups may further be substituted by any of these ones.

$Rl_1$ is preferably a substituted or unsubstituted phenyl group, and more preferably a substituted or unsubstituted 2-hydroxyphenyl or 4-hydroxyphenyl group.

The substituent represented by $Rl_2$ and $Rl_3$ is not specifically limited and examples thereof include the same as those denoted above as the substituent in the substituted aryl group of $Rl_1$. $Rl_2$ and $Rl_3$ are preferably a substituted or unsubstituted alkyl, cycloalkyl, aromatic or heterocyclic group. It is a preferred combination of $Rl_2$ and $Rl_3$ when both of $Rl_2$ and $Rl_3$ are a substituted or unsubstituted phenyl or heterocyclic group or when one of $Rl_2$ and $Rl_3$ is a substituted or unsubstituted phenyl or heterocyclic group and the other is a substituted or unsubstituted alkyl group.

X is preferably $>N-Rl_4$, and $Rl_4$ is preferably a hydrogen atom, an alkyl group, an aromatic group, a heterocyclic group or an acyl group, and more preferably a hydrogen atom, an alkyl group having a carbon atom number of from 1 to 10, an aryl group having a carbon atom number of from 5 to 10 or an acyl group.

Among an azole dye which is an electrochromic compound represented by formula (L), an imidazole dye represented by formula (L2) is preferred.

Formula (L2)

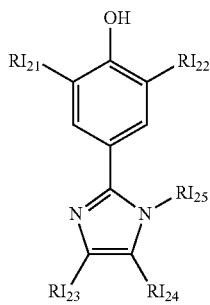

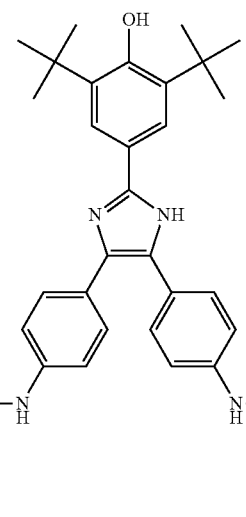
(L1)

In formula (L2), $Rl_{21}$ and $Rl_{22}$ independently represent an aliphatic group, an aliphatic oxy group, an acylamino group, a carbamoyl group, an acyl group, a sulfonamide group or a sulfamoyl group; $Rl_{23}$ represents an aromatic hydrocarbon group or an aromatic heterocyclic group; $Rl_{24}$ represents a hydrogen atom, an aliphatic group, an aromatic hydrocarbon group or an aromatic heterocyclic group; and $Rl_{25}$ represents a hydrogen atom, an aliphatic group, an aromatic hydrocarbon group or an acyl group.

Each of the groups represented by $Rl_{21}$ through $Rl_{25}$ may further have a substituent, provided that at least one of the groups represented by $Rl_{21}$ through $Rl_{25}$ comprises, as the partial structure, —COOH, —P=O(OH)$_2$, —OP=O(OH)$_2$ or —Si(OR)$_3$ (in which R represents an alkyl group).

In formula (L2), it is preferred that $Rl_{21}$ and $Rl_{22}$ are an alkyl group (particularly a branched alkyl group), a cycloalkyl group, an alkylthio group or a cycloalkylthio group. It is preferred that $Rl_{23}$ is a substituted or unsubstituted phenyl group or a substituted or unsubstituted 5- or 6-member heterocyclic group (for example, a thienyl group, a furyl group, a pyrrolyl group or a pyridyl group). It is preferred that $Rl_{24}$ is a substituted or unsubstituted phenyl group, a substituted or unsubstituted 5- or 6-member heterocyclic group or an alkyl group. It is preferred that $Rl_{25}$ is a hydrogen atom or an aryl group.

In the display device of the invention, it is preferred that the compound represented by formula (L) or (L2) has an adsorption group through which the compound is chemically or physically adsorbed on the surface of an electrode. In the invention, the chemical adsorption means a relatively strong adsorption due to chemical bonding through which an adsorption compound is combined with the electrode surface and the physical adsorption means a relatively weak adsorption due to van der Waals force between the adsorption compound and the electrode surface.

In the invention, the adsorption group is preferably an adsorption group having a chemical adsorption ability. The adsorption group having a chemical adsorption ability is preferably —COOH, —P=O(OH)$_2$, —OP=O(OH)$_2$ or —Si(OR)$_3$ (in which R represents an alkyl group).

When the compound represented by formula (L2) is adsorbed and fixed onto the surface of an electrode, it is preferred that at least one of the groups represented by $Rl_{21}$ through $Rl_{25}$ comprises, as the partial structure, —P=O(OH)$_2$ or —Si(OR)$_3$ (in which R represents an alkyl group), and it is especially preferred that the group represented by $Rl_{23}$ or $Rl_{24}$ comprises, as the partial structure, —Si(OR)$_3$ which R represents an alkyl group).

Typical examples of the EC dye, which is represented by formula (L2) or falls outside formula (L2) but within formula (L) will be listed below, but the invention is not specifically limited thereto.

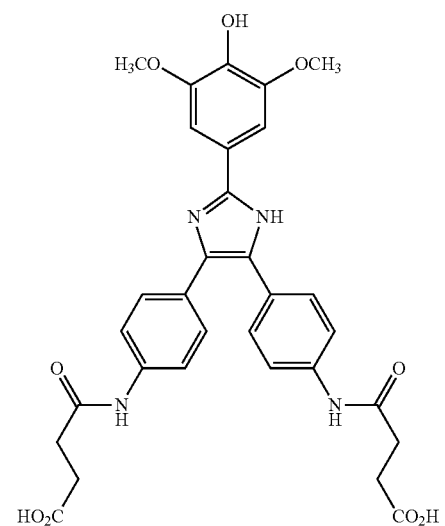
(L2)

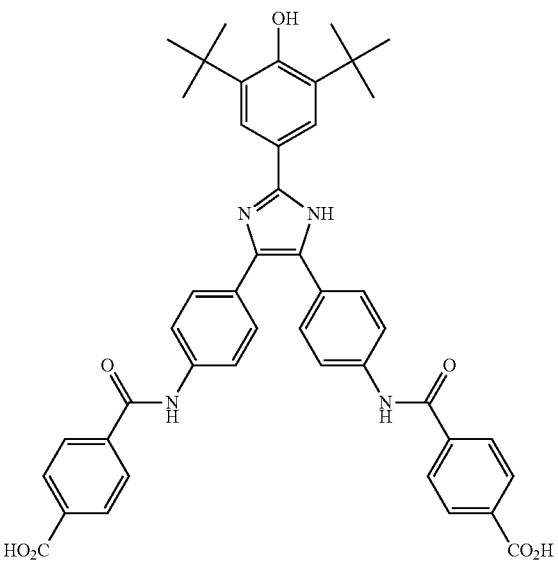
(L3)

(L4) 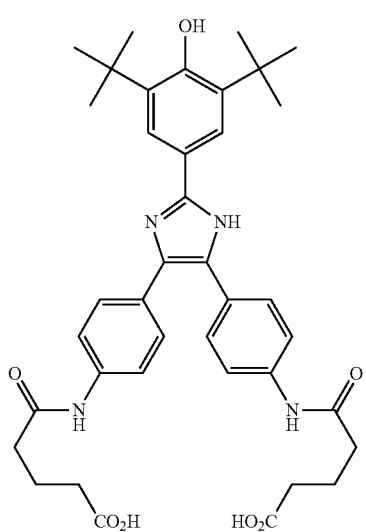
(L5) 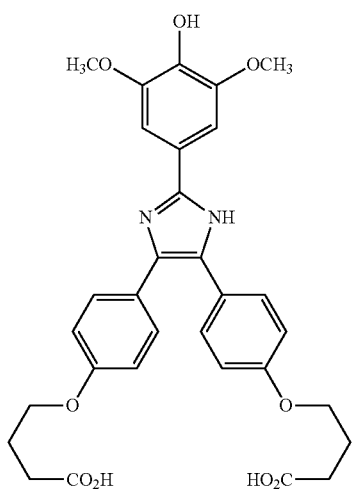
(L6) 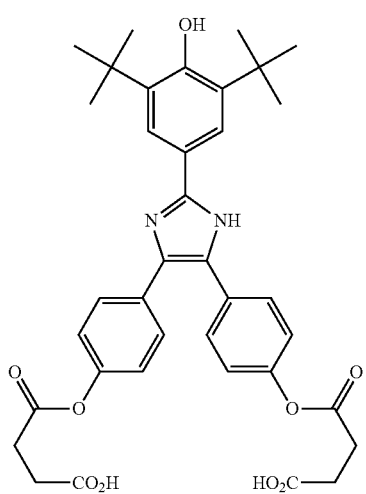
(L7) 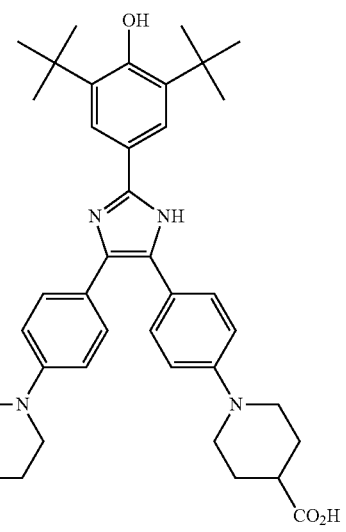
(L8) 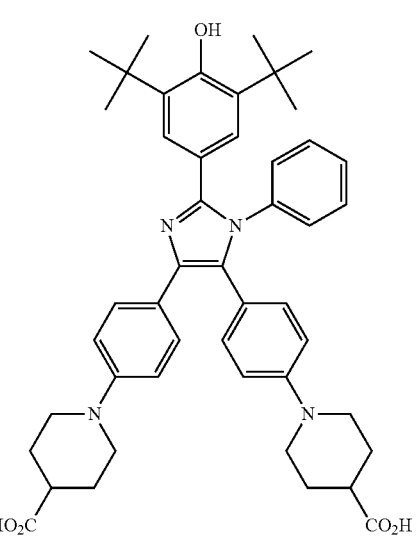
(L9) 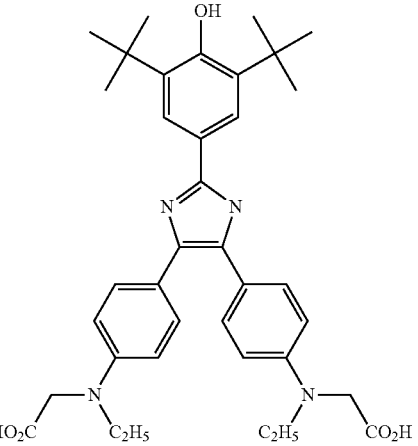

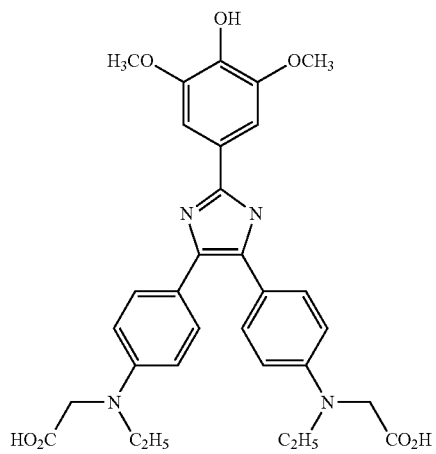
(L10)
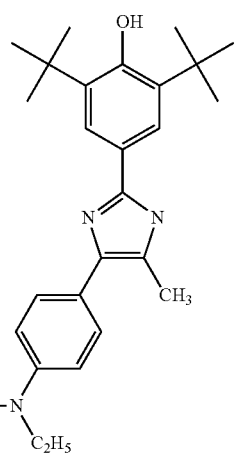
(L13)
(L11)
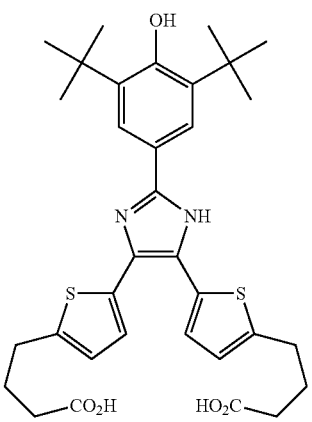
(L14)
(L15)
(L12)
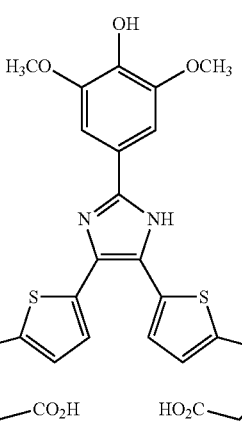
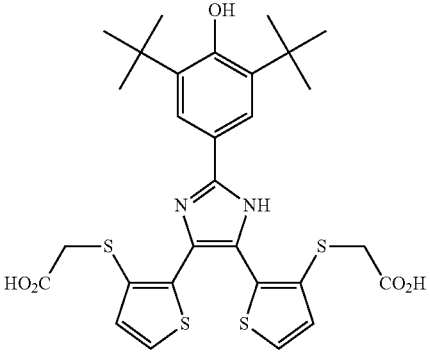
(L16)

(L17)
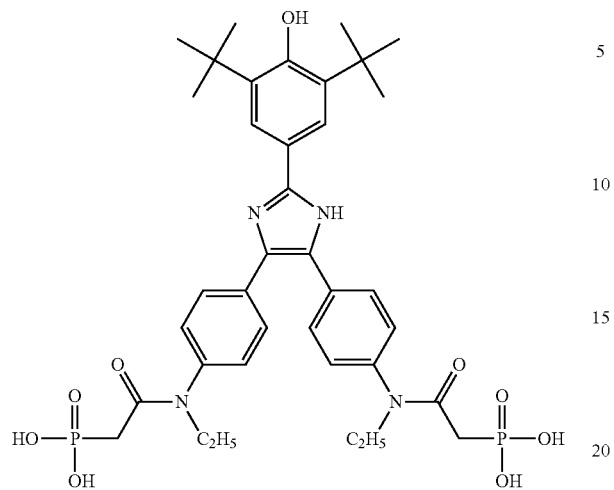
(L20)
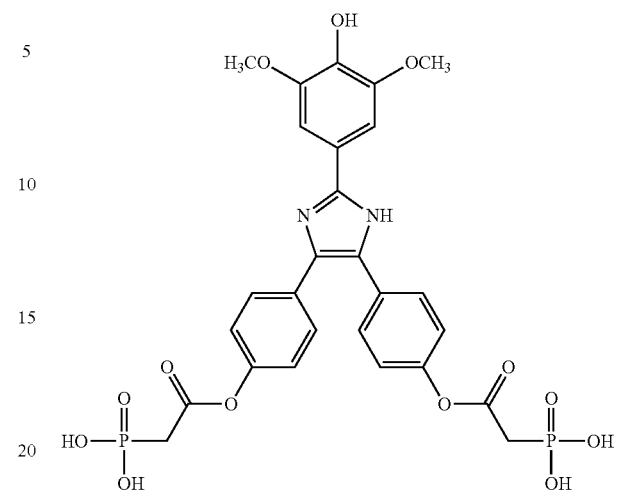
(L18)
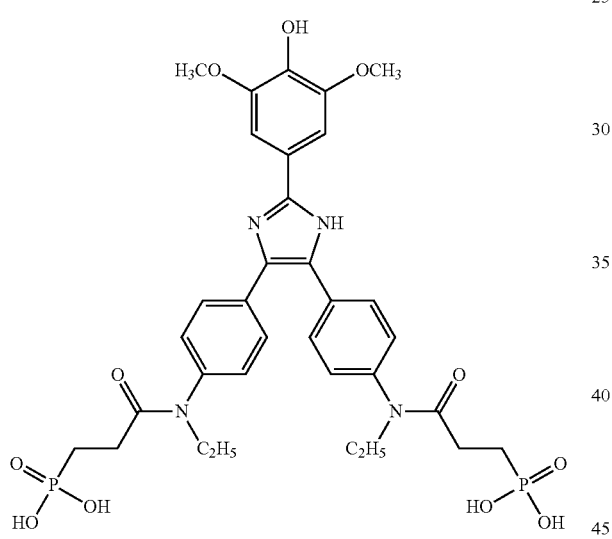
(L21)
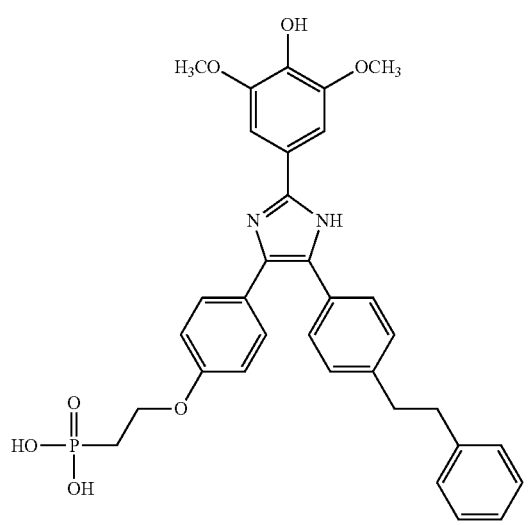
(L19)
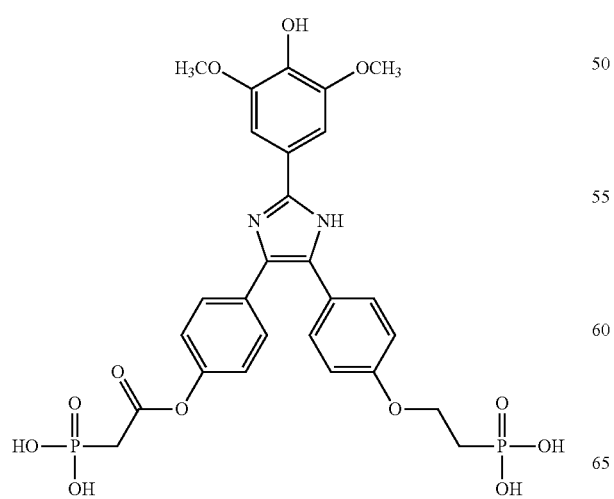
(L22)
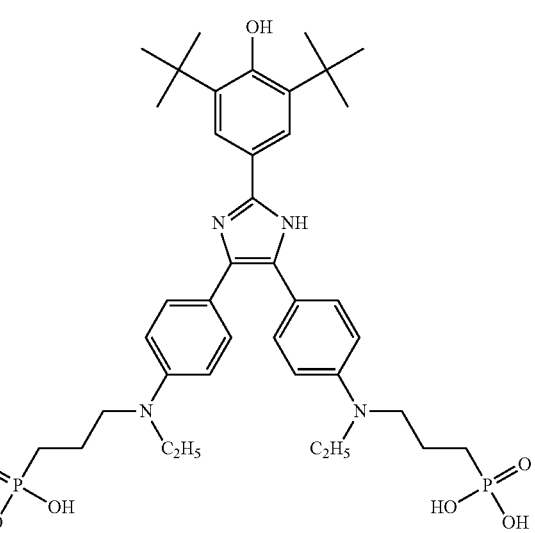

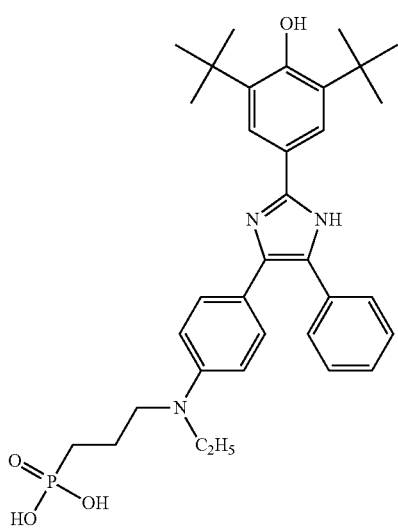
(L23)
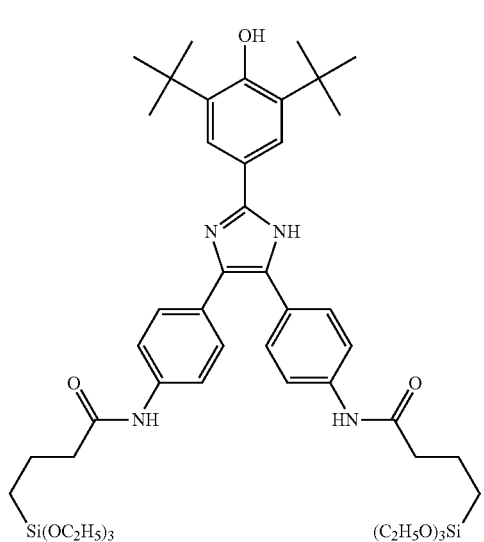
(L26)
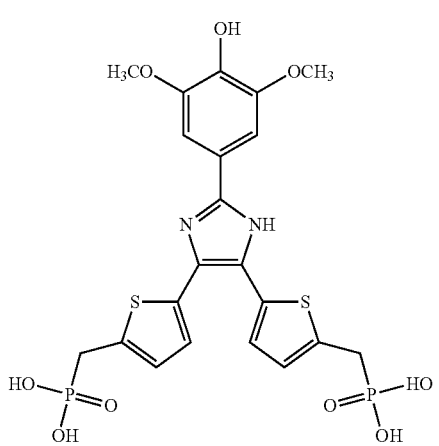
(L24)
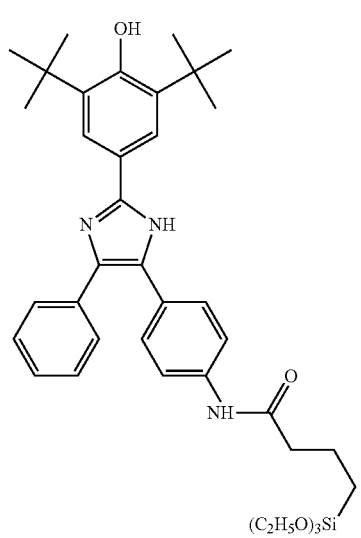
(L27)
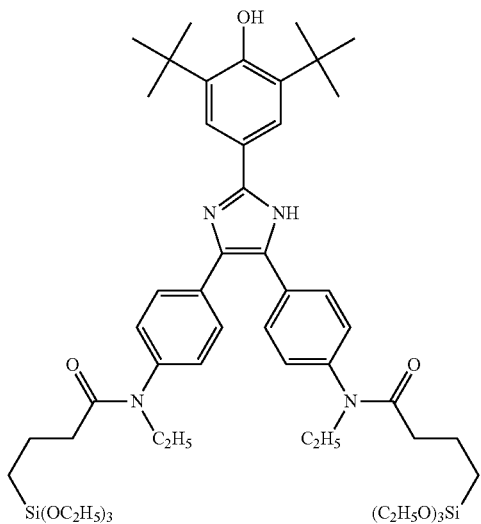
(L25)
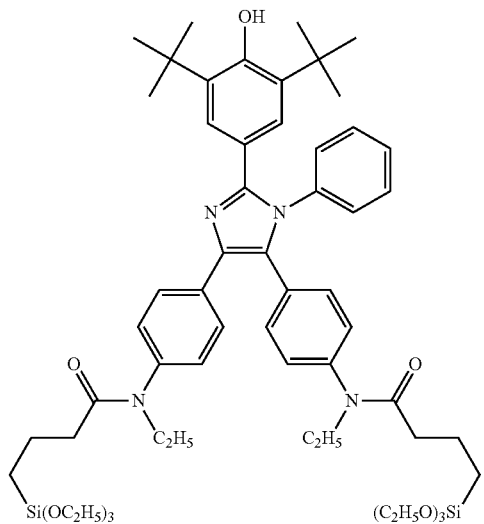
(L28)

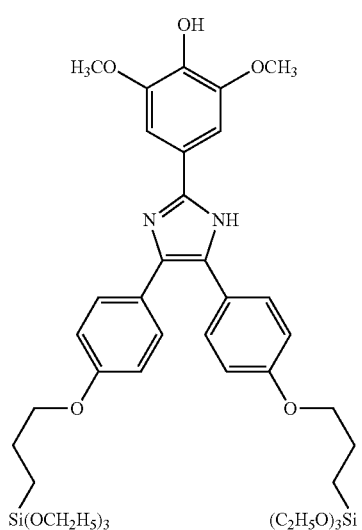
(L29)
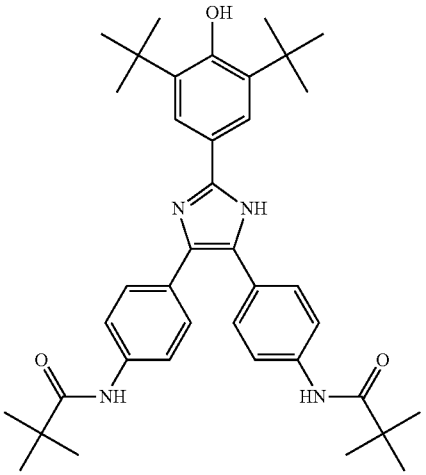
(L32)
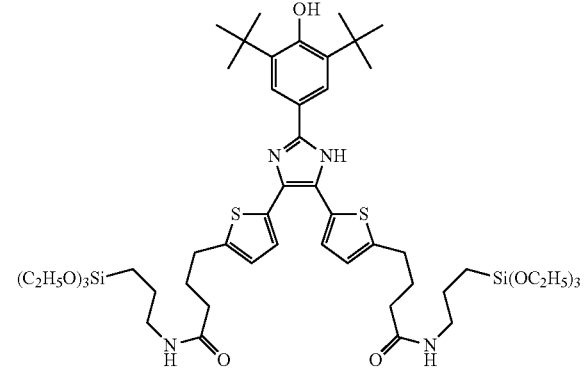
(L30)
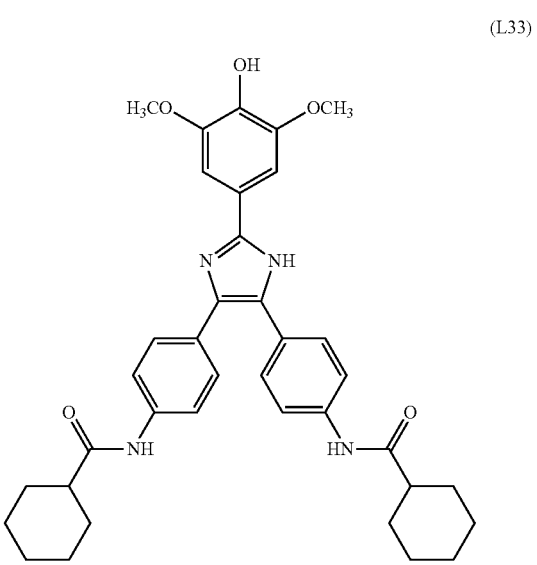
(L33)
(L31)
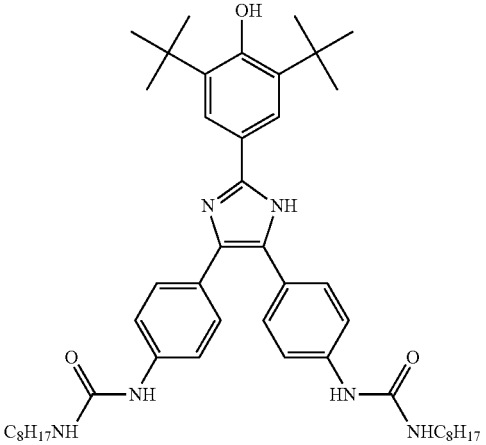
(L34)

(L35) 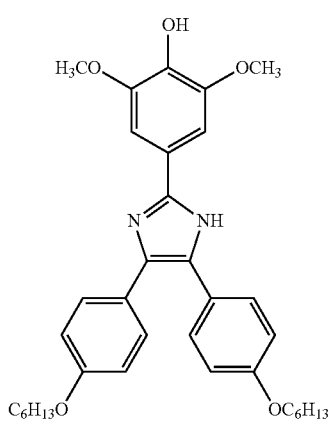
(L38) 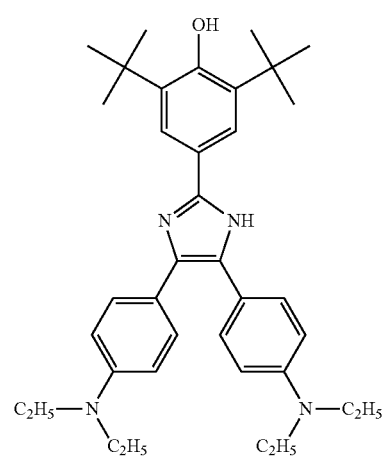
(L36) 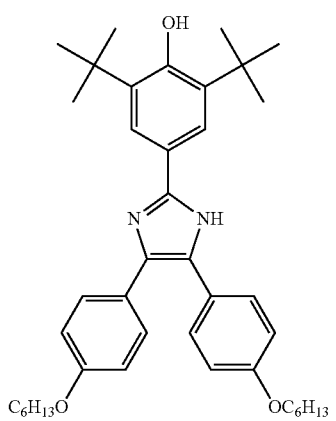
(L39) 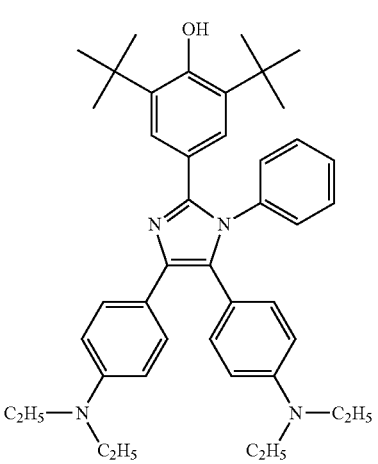
(L37) 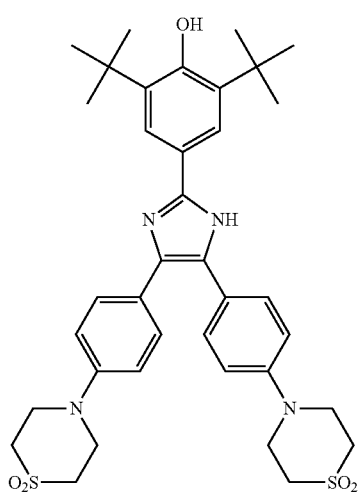
(L40) 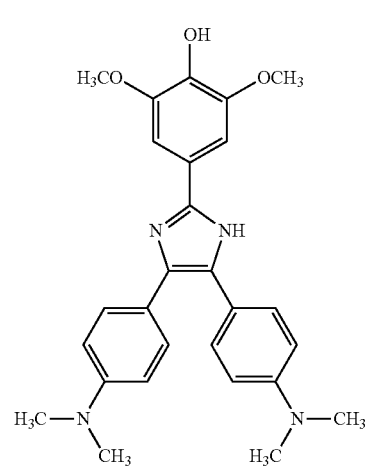

(L41) 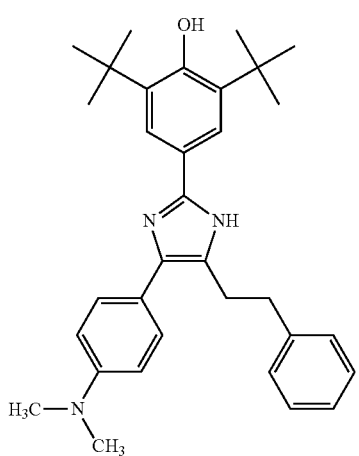
(L42) 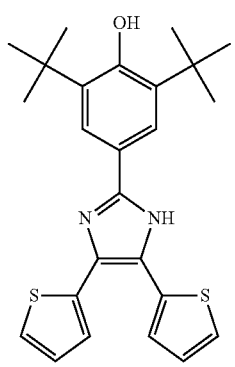
(L43) 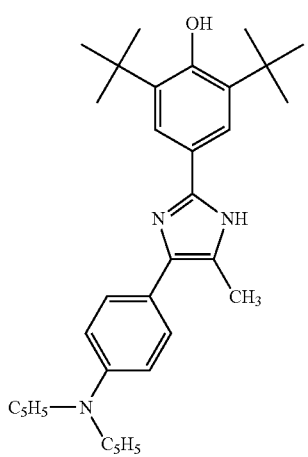
(L44) 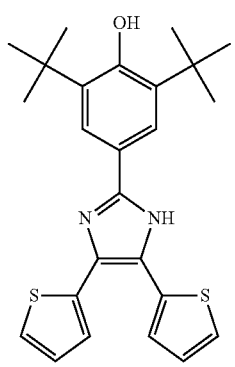
(L45) 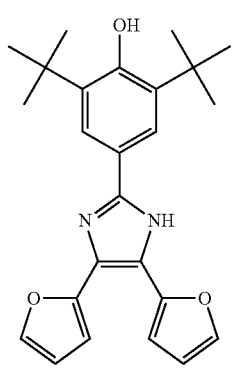
(L46) 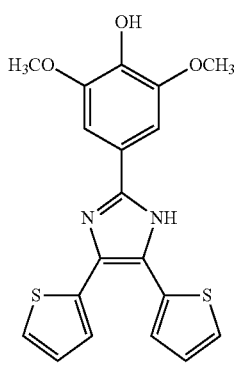
(L47) 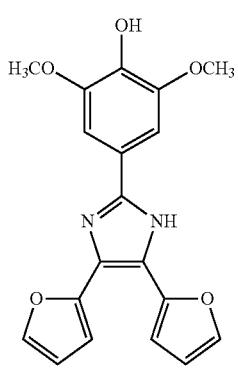

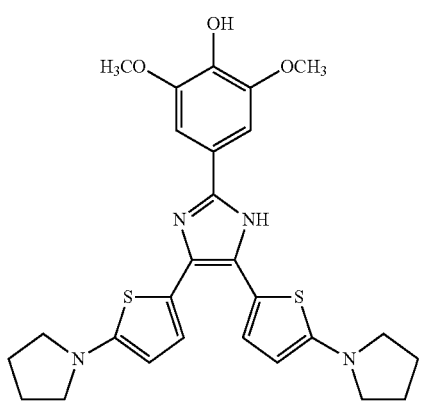
(L48)
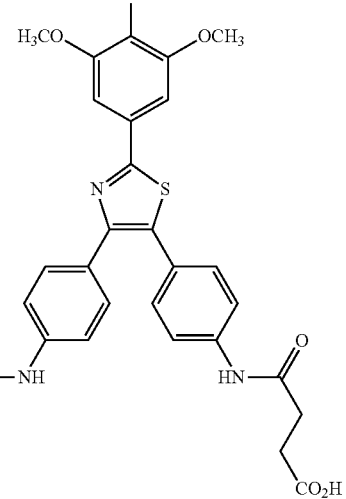
(L51)
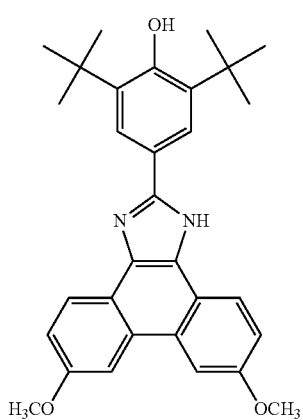
(L49)
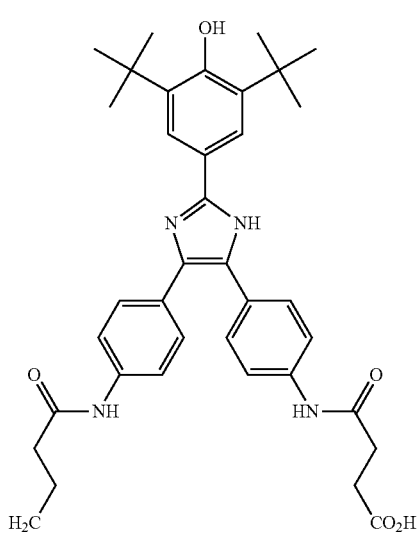
(L50)
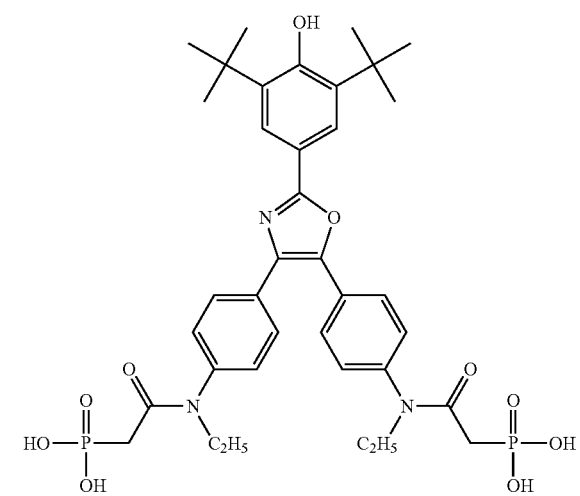
(L52)
(L53)

(L54)
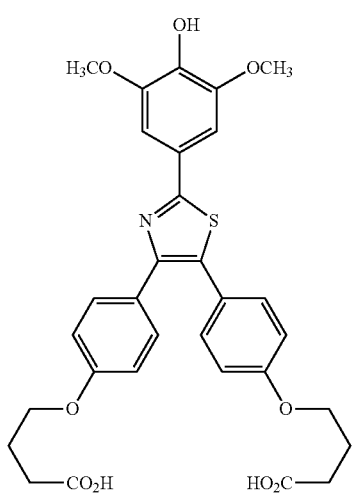
(L57)
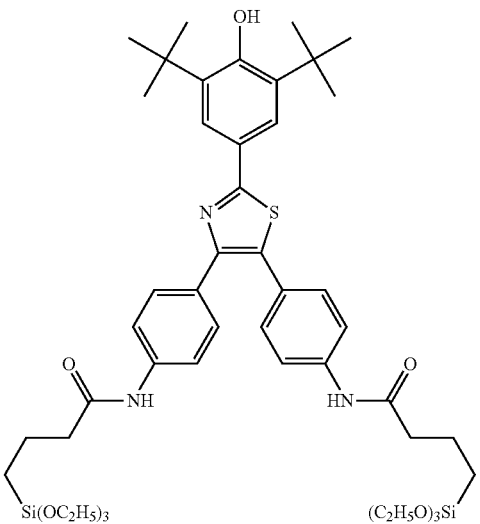
(L55)
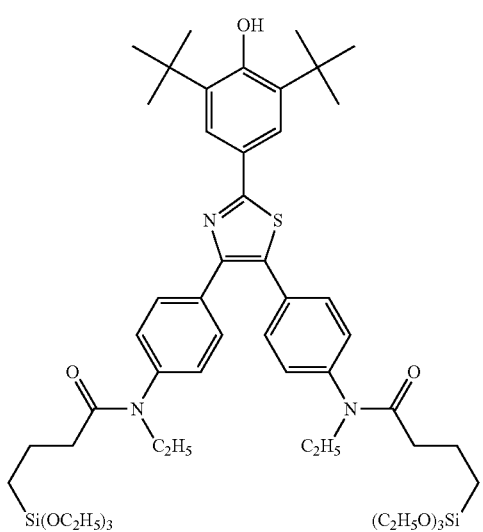
(L58)
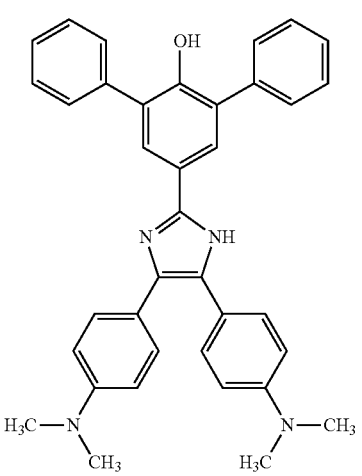
(L56)
(L59)
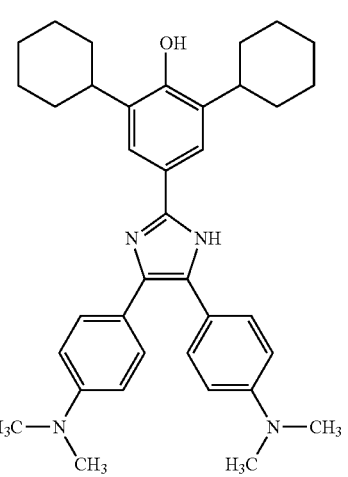

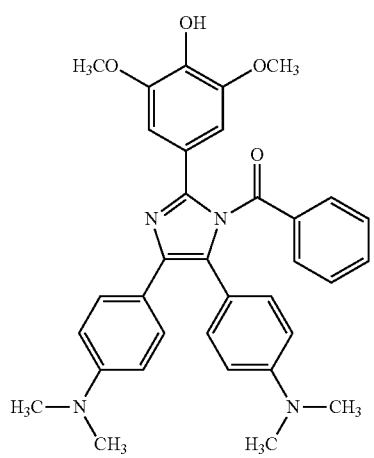
(L60)
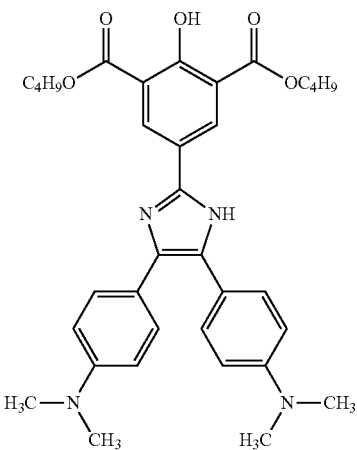
(L63)
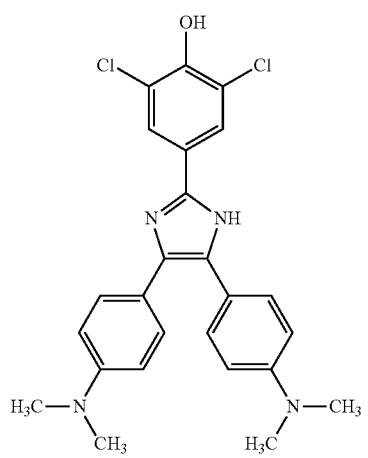
(L61)
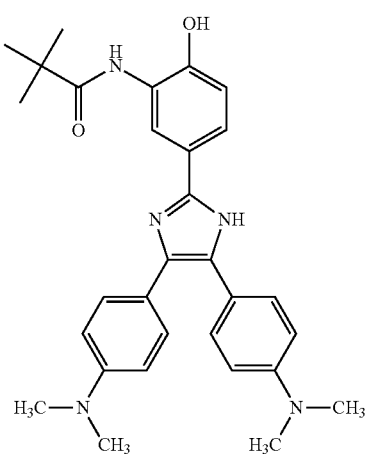
(L64)
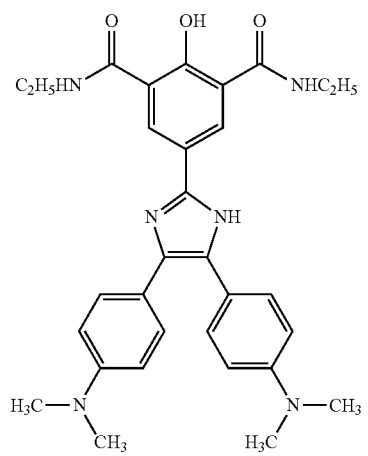
(L62)
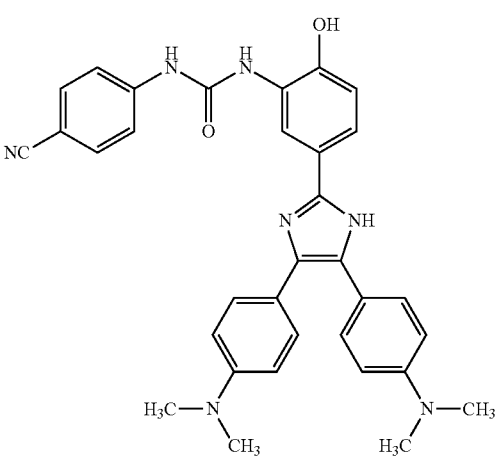
(L65)

(L66)

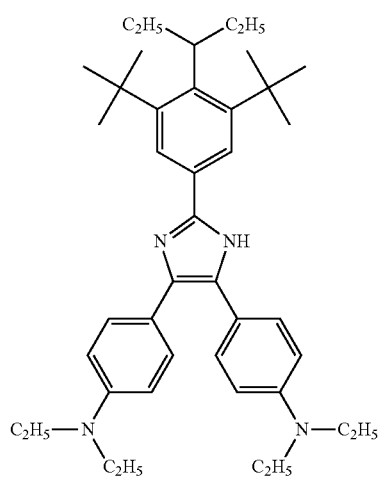

(L67)

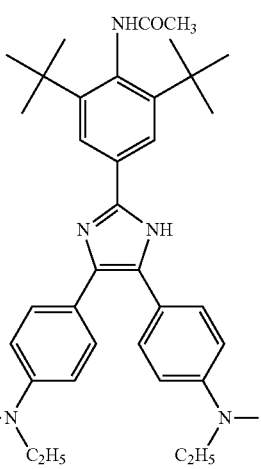

(L68)

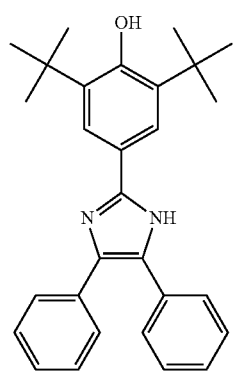

(L69)

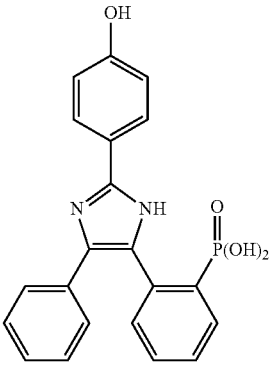

(L70)

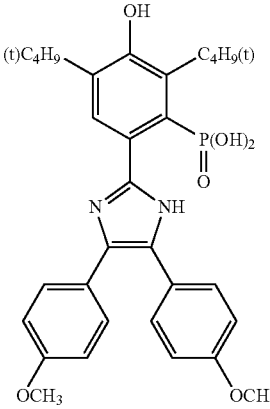

(L71)

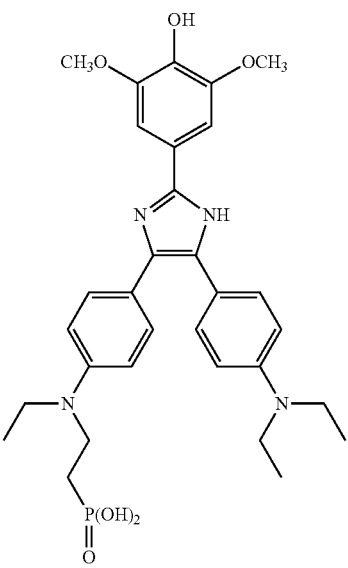

(Metal Species Electrically Conducting Dissolution and Precipitation)

The display device in the present invention can comprise a metal species electrically conducting dissolution and precipitation in a nonaqueous electrolyte composition. Examples of such a metal species include silver, bismuth, copper, nickel, iron, chromium, and zinc. Silver and bismuth are preferred and silver is especially preferred from the viewpoint of providing good black display. These metal species are added in the form of metal salts and preferably in the form of silver salts.

The silver salt compound preferably used in the invention is silver or a compound containing silver in the chemical structure. Herein, "the compound containing silver in the chemical structure" is a collective term of compounds such as silver oxide, silver sulfide, metallic silver, colloidal silver particles, silver halide, silver complexes, or silver ions. Types of phase states such as a solid state, a solubilized state in liquid, or a gaseous state, as well as types of the charged state such as neutral, anionic or cationic are not particularly limited.

In the display device of the invention, employed may be known silver salt compounds such as silver iodide, silver chloride, silver bromide, silver oxide, silver sulfide, silver citrate, silver acetate, silver behenate, silver trifluoromethane sulfonate, silver p-toluene sulfonate, silver salts with mercapto compounds, and silver complexes with iminodiacetic acids. Of these, it is preferable to employ, as silver salts, compounds which do not contain halogen, carboxylic acid, nor a nitrogen atom exhibiting coordination capability with silver, and for example, silver p-toluene sulfonate is preferred.

The metal ion concentration in the nonaqueous electrolyte composition in the invention is preferably 0.2 mol/kg ≤ [Metal] ≤ 2.0 mol/kg. The metal ion concentration of not less than 0.2 mol/kg is sufficient in the metal concentration and can obtain an intended driving rate, and the metal ion concentration of not more than 2 mol/kg can prevent precipitation and improve storage stability at a low temperature of the nonaqueous electrolyte composition.

(Silver Salt Solvent)

In the invention, the silver salt solvent preferably comprises a compound represented by formula (G-1) or (G-2) described later.

<Compound Represented by Formula (G-1) or (G-2)>

$$Rg_{11}\text{-}S\text{-}Rg_{12} \qquad \text{Formula (G-1)}$$

In formula (G-1), $Rg_{11}$ and $Rg_{12}$ independently represent a substituted or unsubstituted hydrocarbon group, provided that $Rg_{11}$ and $Rg_{12}$ may combine with each other to form a ring or the hydrocarbon group may comprise one or more of each of a nitrogen atom, an oxygen atom, a phosphor atom, a sulfur atom and a halogen atom.

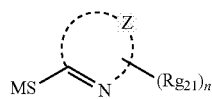

Formula (G-2)

In formula (G-2), M represents a hydrogen atom, a metal atom or a quaternary ammonium group; Z represents an atomic group necessary to faun a nitrogen-containing heterocyclic ring; n is an integer of from 0 to 5; and $Rg_{21}$ represents a hydrogen atom, a halogen atom, an alkyl group, an aryl group, an alkylearbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfarnoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic ring group, provided that when n is 2 or more, plural $Rg_{21}$s may be the same or different and may combine with each other to form a condensed ring.

The thioether compound represented by formula (G-1) above or the mercapto compound represented by formula (G-2) above, which is preferably applicable to the invention, is a compound which works as a silver salt solvent for promoting dissolution or crystallization of a metal species (particularly silver).

The silver solvent is a compound capable of making silver soluble in a nonaqueous electrolyte composition, for example, a compound comprising a chemical structure species which exhibits interaction with silver to form coordination bonding with silver or a weak covalent bonding to silver. Generally, silver or a silver-containing compound is converted to a soluble compound in the presence of such a compound. As the chemical structure species, there are known a halogen atom, a mercapto group, a carboxyl group, an imino group and the like. In the invention, a compound containing a thioether group represented by formula (G-1) or a mercaptoazole compound represented by formula (G-2) works effectively as a silver solvent, and has advantages in that influence on a co-existing compound is less and solubility to a solvent is high.

In formula (G-1) above, $Rg_{11}$ and $Rg_{12}$ independently represent a substituted or unsubstituted hydrocarbon group, provided that $Rg_{11}$ and $Rg_{12}$ may combine with each other to form a ring or the hydrocarbon group may comprise one or more of each of a nitrogen atom, an oxygen atom, a phosphor atom, and a sulfur atom.

As the substituents of the substituted hydrocarbon group, there are, for example, an amino group, a guanidino group, a quaternary ammonium group, a hydroxyl group, a halogen atom, a carboxyl group, a carboxylate group, an amide group, a sulfonic acid group, a sulfonic acid group, a sulfate group, a phosphonic acid group, a phosphate group, a nitro group and a cyano group.

Typical examples of the compound represented by formula (G-1) applicable to the invention will be listed below, but the invention is not specifically limited thereto.

G1-1: $CH_3SCH_2CH_2OH$
G1-2: $HOCH_2CH_2SCH_2CH_2OH$
G1-3: $HOCH_2CH_2SCH_2CH_2SCH_2CH_2OH$
G1-4: $HOCH_2CH_2SCH_2CH_2SCH_2CH_2SCH_2CH_2OH$
G1-5: $HOCH_2CH_2SCH_2CH_2SCH_2CH_2SCH_2CH_2SCH_2CH_2OH$
G1-6: $HOCH_2CH_2OCH_2CH_2SCH_2CH_2SCH_2CH_2OCH_2CH_2OH$
G1-7: $H_3CSCH_2CH_2COOH$
G1-8: $HOOCCH_2SCH_2COOH$
G1-9: $HOOCCH_2CH_2SCH_2CH_2COOH$
G1-10: $HOOCCH_2SCH_2CH_2SCH_2COOH$
G1-11: $HOOCCH_2SCH_2CH_2SCH_2CH_2SCH_2CH_2SCH_2COOH$
G1-12: $HOOCCH_2SCH_2CH_2SCH_2CH(OH)CH_2SCH_2CH_2SCH_2CH_2COOH$
G1-13: $HOOCCH_2CH_2SCH_2CH_2SCH_2CH(OH)CH(OH)CH_2SCH_2CH_2SCH_2CH_2OH$
G1-14: $H_3CSCH_2CH_2CH_2NH_2$
G1-15: $H_2NCH_2CH_2SCH_2CH_2NH_2$
G1-16: $H_2NCH_2CH_2SCH_2CH_2SCH_2CH_2NH_2$
G1-17: $H_3CSCH_2CH_2CH(NH_2)COOH$
G1-18: $H_2NCH_2CH_2OCH_2CH_2SCH_2CH_2SCH_2CH_2OCH_2CH_2NH_2$
G1-19: $H_2NCH_2CH_2SCH_2CH_2OCH_2CH_2OCH_2CH_2SCH_2CH_2NH_2$
G1-20: $H_2NCH_2CH_2SCH_2CH_2SCH_2CH_2SCH_2CH_2SCH_2CH_2NH_2$

G1-21: HOOC(NH$_2$)CHCH$_2$CH$_2$SCH$_2$CH$_2$SCH$_2$CH$_2$CH(NH$_2$)COOH
G1-22: HOOC(NH$_2$)CHCH$_2$SCH$_2$CH$_2$OCH$_2$CH$_2$OCH$_2$CH$_2$SCH$_2$CH(NH$_2$)COOH
G1-23: HOOC(NH$_2$)CHCH$_2$OCH$_2$CH$_2$SCH$_2$CH$_2$SCH$_2$CH$_2$OCH$_2$CH(NH$_2$)COOH
G1-24: H$_2$N(O=)CCH$_2$SCH$_2$CH$_2$OCH$_2$CH$_2$OCH$_2$CH$_2$SCH$_2$C(=O)NH$_2$
G1-25: H$_2$N(CCH$_2$SCH$_2$CH$_2$SCH$_2$C(O=)NH$_2$
G1-26: H$_2$NHN(O=)CCH$_2$SCH$_2$CH$_2$SCH$_2$C(=O)NHNH$_2$
G1-27: H$_3$C(O=)NHCH$_2$CH$_2$SCH$_2$CH$_2$SCH$_2$CH$_2$NHC(=O)CH$_3$
G1-28: H$_2$NO$_2$SCH$_2$CH$_2$SCH$_2$CH$_2$SCH$_2$CH$_2$SO$_2$NH$_2$
G1-29: NaO$_3$SCH$_2$CH$_2$CH$_2$SCH$_2$CH$_2$SCH$_2$CH$_2$CH$_2$SO$_3$Na
G1-30: H$_3$CSO$_2$NHCH$_2$CH$_2$SCH$_2$CH$_2$SCH$_2$CH$_2$NHO$_2$SCH$_3$
G1-31: H$_2$N(NH=)CSCH$_2$CH$_2$SC(=NH)NH$_2$.2HBr
G1-32: H$_2$N(NH=)CSCH$_2$CH$_2$OCH$_2$CH$_2$OCH$_2$CH$_2$SC(=NH)NH$_2$.2HCl
G1-33: H$_2$N(NH=)CNHCH$_2$CH$_2$SCH$_2$CH$_2$SCH$_2$CH$_2$NHC(=NH)NH$_2$.2HBr
G1-34: [(CH$_3$)$_3$NCH$_2$CH$_2$SCH$_2$CH$_2$SCH$_2$CH$_2$N(CH$_3$)$_3$]$^{2+}$, 2Cl$^-$

G1-35
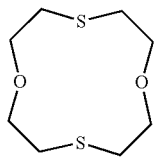

G1-36
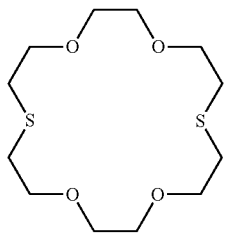

G1-37
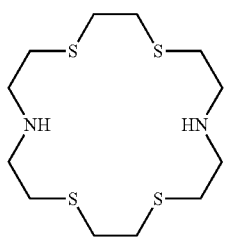

G1-38
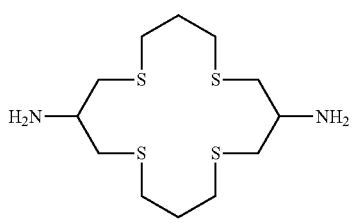

G1-39
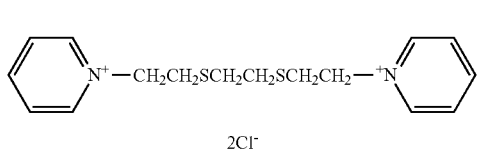
2Cl$^-$

G1-40

G1-41
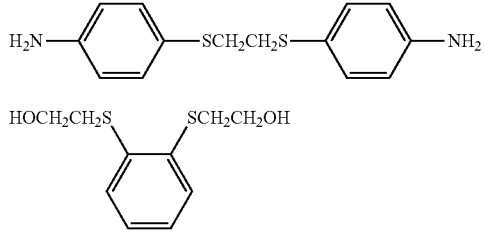

G1-42
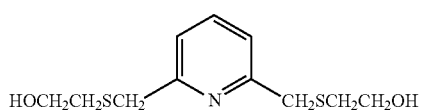

G1-43
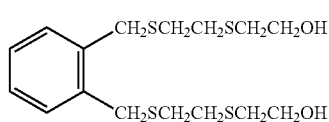

G1-44
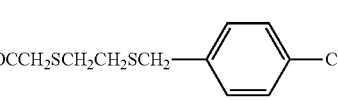

G1-45

G1-46
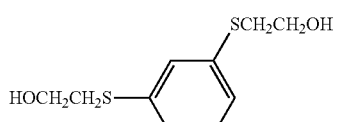

G1-47

Among the exemplified compounds described above, Compounds G1-2 and G1-3 are especially preferred in view of exerting the effects of the invention.

Next, a compound represented by formula (G-2) will be explained. In formula (G-2) above, examples of a metal atom represented by M include Li, Na, K, Mg, Ca, Zn and Ag, and examples of the quaternary ammonium include NH$_4$, N(CH$_3$)$_4$, N(C$_4$H$_9$)$_4$, N(CH$_3$)$_3$C$_{12}$H$_{25}$, N(CH$_3$)$_3$C$_{16}$H$_{33}$, and N(CH$_3$)$_3$CH$_2$C$_6$H$_5$.

Examples of the nitrogen-containing heterocyclic ring comprising Z include a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

In the group represented by Rg$_{21}$, examples of the halogen atom include a fluorine atom, chlorine atom, a bromine atom and iodine atom; examples of the alkyl group include a methyl group, an ethyl group, a propyl group, an i-propyl group, a butyl group, a t-butyl group, a pentyl group, a cyclopentyl group, a hexyl group, a cyclohexyl group, a octyl group, a dodecyl group, a hydroxyethyl group, a methoxyethyl group, a trifluoromethyl group and a benzyl group;

examples of the aryl group include a phenyl group and a naphthyl group; examples of the alkylcarbonamide group include an acetylamino group, a propionylamino group and a butyroylamino group; examples of the arylcarbonamide group include a benzoylamino group; examples of the alkylsulfonamide group include a methanesulfonylamino group and an ethanesulfonylamino group; examples of the arylsulfoneamide group include a benzenesulfonylamino group and a toluenesulfonylamino group; examples of the acyloxy group include a phenoxy group; examples of the allylthio group include a methylthio group, an ethylthio group, and a butylthio group; examples of the arylthio group include a phenylthio group and a tolylthio group; examples of the alkylcarbamoyl group include a methylcarbamoyl group, a dimethylcarbamoyl group, an ethylcarbamoyl group, a dimethylcarbamoyl group, a dibutylcarbamoyl group, a piperidylcarbamoyl group and a morphorylcarbamoyl group; examples of the arylcarbamoyl group include a phenylcarbamoyl group, a methylphenylcarbamoyl group, an ethylphenylcarbamoyl group and a benzylphenylcarbamoyl group; examples of the alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group and a morpholylsulfamoyl group; examples of the arylsulfamoyl group include a phenylsulfamoyl group, a methylphenylsulfamoyl group, an ethylphenylsulfamoyl group and a benzylphenylsulfamoyl group; examples of the alkylsulfonyl group include a methanesulfonyl group and an ethanesulfonyl group; examples of the arylsulfonyl group include a phenylsulfonyl group, a 4-chlorophenylsulfonyl group and a p-toluenesulfonyl group; examples of the alkoxycarbonyl group include a methoxycarbonyl group, an ethoxycarbonyl group and a butoxycarbonyl group; examples of the aryloxycarbonyl group include a phenoxycarbonyl group; examples of the alkylcarbonyl group include an acetyl group, a propionyl group and a butyroyl group; examples of the arylcarbonyl group include a benzoyl group and an alkylbenzoyl group; examples of the acyloxy group include an acetyloxy group, a propionyloxy group and a butyroyloxy group; and examples of the heterocyclic ring group include an oxazole ring group, a thiazole ring group, a triazole ring group, a selenazole ring group, a tetrazole ring group, an oxadiazole ring group, a thiadiazole ring group, a thiazine ring group, a triazine ring group, a benzoxazole ring group, a benzthiazole ring group, an indolenine ring group, a benzoselenazole ring group, a naphthothiazole ring group, a triazaindolidine ring group, a diazaindolidine ring group, and a tetrazaindolidine ring group. These groups may further have a substituent.

Preferred examples of the compound represented by formula (G-2) applicable to the invention will be listed below, but the invention is not specifically limited thereto.

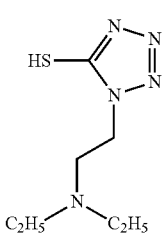
G2-1

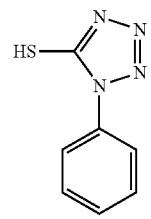
G2-2

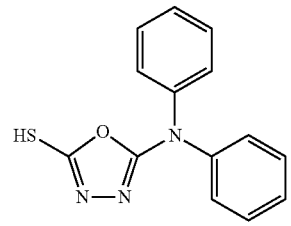
G2-3

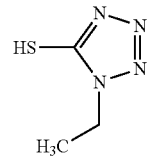
G2-4

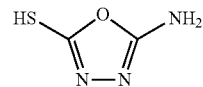
G2-5

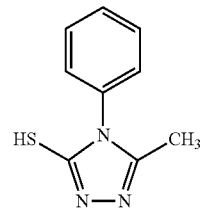
G2-6

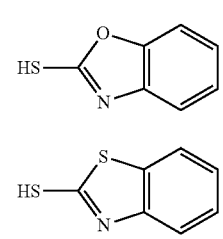
G2-7

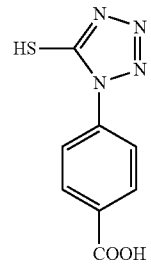
G2-8

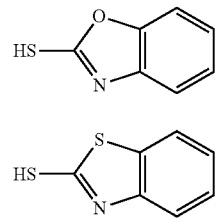
G2-9

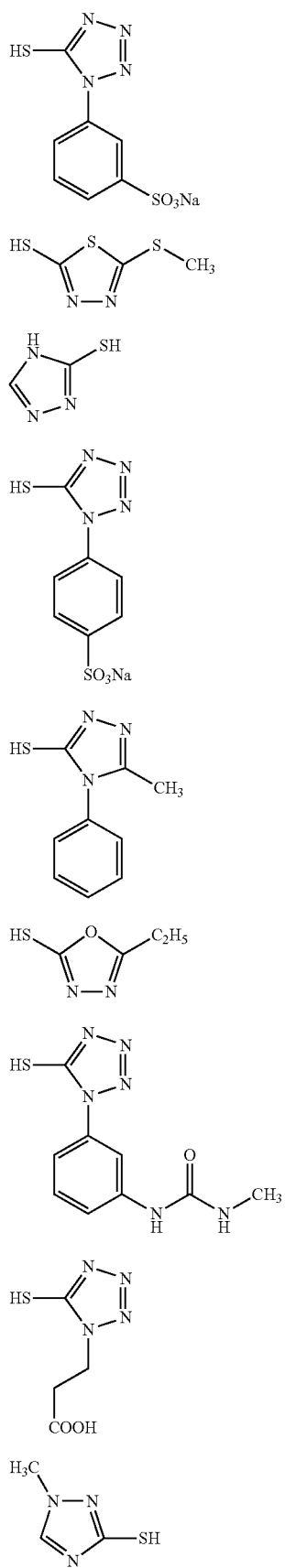

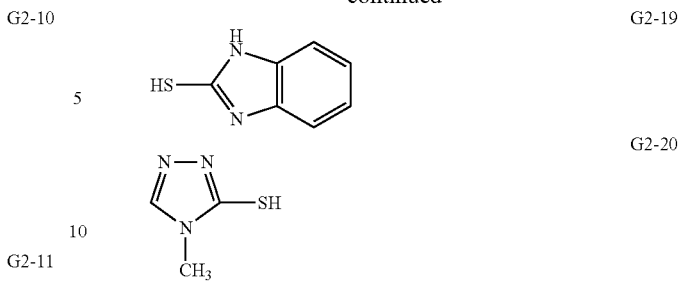

Among the exemplified compounds described above, Compounds G2-12, G2-13, G2-18 and G2-20 are especially preferred in view of exerting the effects of the invention.

(Constitution of Display Device)

Preferred embodiment of the display device of the invention comprises a mixture of the electrochromic compounds described above exhibiting a different coloration. Particularly, a combined use of an electrochromic compound exhibiting color other than black and a salt of a metal such as silver or bismuth exhibiting good black makes it possible to display, in a simple constitution, multi-colors which are three or more kinds of colors including black, white and colors other than black. In this case, since the metal salt displays black on reduction, an electrochromic compound used in combination is preferably a compound developing color on oxidation, and especially preferably a compound represented by formula (L) in view of many color variations, low driving voltage, good memory performance and the like.

[Constitution of Secondary Battery]

Next, a secondary battery employing the electrochemical device of the invention, typically a lithium ion secondary battery will be explained.

The lithium ion secondary battery in the invention comprises a positive electrode in which a positive electrode active material and an electrode mixture agent are fixed onto a first collector, a negative electrode in which a negative electrode active material and an electrode mixture agent are fixed onto a second collector, and an electrolyte composition.

(Positive Electrode Active Material)

As a positive electrode active material, an inorganic active material, an organic active material and a composite material thereof can be cited, but an inorganic active material, and a composite material composed of an inorganic active material and an organic active material are preferable in view of generation of large energy density.

Examples of the inorganic active material include metal oxides such as $Li_{0.3}MnO_2$, $Li_4Mn_5O_{12}$, $V_2O_5$, $LiCoO_2$, $LiMn_2O_4$, $LiNiO_2$, $LiFePO_4$, $Li_{1.2}(Fe_{0.5}Mn_{0.5})_{0.8}O_2$, $Li_{1.2}(Fe_{0.4}Mn_{0.4}Ti_{0.2})_{0.8}O_2$, $Li_{1+x}(Ni_{0.5}Mn_{0.5})_{1-x}O_2$, $LiNi_{0.5}Mn_{1.5}O_4$, $Li_2MnO_3$, $Li_{0.76}Mn_{0.5}Ti_{0.49}O_2$, $LiNi_{0.8}Co_{0.15}Al_{0.05}O_2$ and $Fe_2O_3$; and phosphoric acids, silic acids and boric acids such as $LiFePO_4$, $LiCoPO_4$, $LiMnPO_4$, $Li_2MPO_4$ (M=Fe or Mn), $LiMn_{0.875}Fe_{0.125}PO_4$, $Li_2FeSiO_4$, $Li_{2-x}MSi_{1-x}P_xO_4$ (M=Fe or Mn) and $LiMBO_3$ (M=Fe or Mn). In addition, in these chemical formulae, x is preferably within the range of 0 and 1.

Further, examples of the other inorganic active material include fluorinated compounds such as $FeF_3$, $Li_3FeF_6$, and $Li_2TiF_6$, metal sulfides such as $Li_2FeS_2$, $TiS_2$, $MoS_2$, and $FeS$, and lithium composite oxides with these compounds.

Examples of the organic active material include a conductive polymer such as polyacetylene, polyaniline, polypyrrole, polythiophene or polyparaphenylene; an organic disulfide; an organic sulfur compound DMcT (2,5-dimercapto-1,3,4-thiadiazole); a benzoquinone compound PDBM poly(2,5-dihydroxy-1,4-benzoquirione-3,6-methylene); carbon disulfide; a sulfur-containing positive electrode material such as active sulfur; and an organic radical compound.

Further, it is preferred in view of life extension of a battery that an inorganic oxide is coated on the surface of a positive electrode active material. In the coating method of the inorganic oxide, the inorganic oxide is preferably coated on the surface of the positive electrode active material is preferred, and a coating method, which employs a surface-modifying apparatus such as a hybridizer, is preferred as the coating method.

Examples of such an inorganic oxide include oxides of elements belonging to IIA-VA groups, transition metals or elements belonging to IIIB group or IVB group such as magnesium oxide, silicon oxide, alumina, zirconia and titanium dioxide; barium titanate; calcium titanate; lead titanate, $\gamma$-LiAlO$_2$ and LiTiO$_3$. Silicon oxide is especially preferred.

(Negative Electrode Active Material)

The negative electrode is not particularly limited, and one in which a negative electrode active material is provided on a collector can be utilized. Utilized is one which is prepared by coating and drying a paste formed from a mixture of powder such as graphite or tin alloy and a binder such as styrene butadiene rubber or polyvinylidene fluoride on the collector, followed by press-molding.

Also utilized is a silicon-based thin film negative electrode in which a 3 to 5 μm thick silicon-based thin film is directly formed on a collector via physical vapor deposition evaporation such as a sputtering method, a vacuum evaporation method or the like. In the case of a lithium metal negative electrode, preferred is one in which a 10 to 30 μm thick lithium foil is provided onto a copper foil. The silicon-based thin film negative electrode and the lithium metal negative electrode are preferred from the viewpoint of high capacity.

(Electrode Mixture Agent)

As the electrode mixture agent, there are mentioned ones containing a lithium salt, an aprotic organic solvent and the like, as well as a conductive agent, a binder and fillers.

A secondary battery comprises the conductive agent. Examples of the conductive agent include conductive materials such as natural graphite (for example, flake graphite, scale-like graphite, earth graphite and so forth), artificial graphite, carbon black, acetylene black, ketjen black, carbon fiber, metal powder made of copper, nickel, aluminum or silver (disclosed in Japanese Patent O.P.I. Publication No. 63-148554), metal fiber, a polyphenylene derivative (disclosed in Japanese Patent O.P.I. Publication No. 59-20971). These conductive materials can be used singly or as an admixture of two or more kinds thereof.

Of these, a combined use of graphite and acetylene black are especially preferred. The conductive agent content is preferably from 1 to 50% by weight, and more preferably from 2 to 30% by weight. when carbon or graphite is used, the carbon or graphite content is preferably from 2 to 15% by weight.

It is preferred that a binder is employed in order to bear the electrode mixture agent. As such an electrode mixture agent, there is mentioned polysaccharide, a thermoplastic resin or a polymer exhibiting rubber elasticity. Of these, preferred are a water-soluble polymer such as starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinyl pyrrolidone, polyacrylonitrile, polyacrylamide, polyhydroxyethyl (meth)acrylate or a styrene-maleic acid copolymer, and an emulsion (latex) or a suspension of polyvinyl chloride, polytetrafluoroethylene, polyvinylidene fluoride, a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), sulfonated EPDM, a polyvinylacetal resin, a (meth)acrylic acid ester copolymer containing (meth) acrylic acid ester such methyl methacrylate or 2-ethylhexylacrylate, a (meth)acrylic acid ester-acrylonitrile copolymer, a polyvinyl ester copolymer containing a vinyl ester such as vinyl acetate, a styrene-butadiene copolymer, an acrylonitrile-butadiene copolymer, polybutadiene, neoprene rubber, fluorine-contained rubber, polyethylene oxide, a polyester polyurethane resin, a polyether polyurethane resin, a polycarbonate polyurethane resin, a polyester resin, a phenol resin or an epoxy resin. Polyacrylic acid ester-based latex, carboxymethyl cellulose, polytetrafluoroethylene and polyvinylidene fluoride are more preferred.

The binders may be used singly or as an admixture of two or more kinds thereof. The binder content is preferably from 1 to 30% by weight, and more preferably from 2 to 10% by weight. The above content range of the binder can secure sufficient retention and coagulation force of the electrode mixture agent.

As the fillers described above, fibers made of an olefin polymer such as polypropylene or polyethylene, glass or carbon are used in a secondary battery of the invention. The filler content is not specifically limited, but it is preferably from 0 to 30% by weight.

(Collector)

In the lithium ion secondary battery, electron conductors are employed as positive and negative electrode collectors. The positive electrode collector is preferably made of aluminum, an aluminum alloy, stainless steel, nickel, titanium, or aluminum or stainless steel which is surface-treated with carbon, nickel, titanium or silver. Of these, the positive electrode collector is more preferably made of aluminum or an aluminum alloy.

The negative electrode collector is preferably made of copper, a copper alloy, stainless steel, nickel or titanium, and more preferably made of copper or a copper alloy.

As the collector, conventionally used is one in the form of a film sheet, but a porous body, a foam, a fibrous group mold and so forth are also usable. The thickness of the collector is not specifically limited, and is preferably from 1 to 500 μm. Further, the surface of the collector is preferably roughened via surface treatment.

(Preparation of Electrode)

Next, preparation of an electrode of the lithium ion secondary battery in the invention will be explained. The shape of the lithium ion secondary battery in the invention can be any of sheet shape, prismatic shape, cylindrical shape and so forth. The electrode mixture agent for a positive electrode active material and a negative electrode active material, being coated on a collector and dried, followed by compression, is employed.

Preferred examples of the coating method of the electrode mixture agent include a reverse roll method, a direct roll method, a blade method, a knife method, an extrusion method, a curtain method, a gravure method, a dipping method and a squeeze method. Of these, a blade method, a knife method and an extrusion method are preferred. Further, the coating is preferably carried out at a speed of from 0.1 to 100 m/min. In this case, an excellent surface of the coated layer can be obtained employing a coating method selected from among the above-described coating methods, considering physical properties or drying properties of the electrode mixture agent solution. The coating may be conducted on one surface after the other surface, and may also be conducted on the both surfaces at the same time.

Further, the coating may also be continuous coating, intermittent coating or stripe coating. The thickness, length and width of the coating layer are determined depending on shape and size of the battery, but the coating layer, which was coated on one surface, dried and compressed, has a thickness of preferably from 1 to 2000 μm.

In order to dry and dehydrate the coating material for the electrode sheet, hot air, vacuum, infrared rays, far-infrared rays, electron beams and low moisture air can be used singly or in combination. The drying temperature is preferably from 80 to 350° C., and more preferably from 100 to 250° C.

The total moisture content of the entire battery is preferably 2000 ppm or less, and the moisture content of the positive electrode mixture agent, the negative electrode mixture agent or the electrolyte composition is preferably 500 ppm or less. As a method of compressing the sheet, a conventional method is usable, and a calendar pressing method is especially preferred. The pressing pressure is not specifically limited, but the pressing pressure is preferably from 19.6 to 294 MPa. In the foregoing calendar pressing method, the press speed id preferably from 0.1 to 50 m/minute, and the press temperature is preferably from room temperature to 200° C. A width ratio of a negative electrode to a positive electrode width is preferably from 0.9 to 1.1, and more preferably from 0.95 to 1.0. The content ratio of a negative electrode to a positive electrode differs depending on kinds of compounds used or formulation of the electrode mixture agent.

The form of the lithium ion secondary battery of the invention is not specifically limited, but the secondary battery can be enclosed in each of various cells in the form of a coin, a sheet, a cylinder or the like.

Application of the secondary battery in the invention is not specifically limited, but examples of electronic devices to which the battery is applied include a notebook PC, a stylus-operated PC, a mobile PC, an electronic book player, a cellular phone, a cordless telephone handset, a pager, a handy terminal, a handy fax machine, a handy copier, a handy printer, a headphone stereo, a video movie player, a liquid crystal TV, a handy cleaner, a portable CD, a mini disc, an electronic shaver, a transceiver, an electronic diary, an electronic calculator, a memory card, a handy tape recorder, a radio, a backup power supply, and a memory card.

Examples of other applications for consumer use include an automobile, an electronic vehicle, a motor, fluorescent light fittings, a toy, a game machine, a load conditioner, a watch, a stroboscope, a camera, a medical device (a pace maker, a hearing aid, a shoulder massage tool or the like) and so forth. Further, the secondary battery can be applied for military and apace products, and can also be applied in combination with a solar battery.

EXAMPLES

Next, the present invention will be explained in the following examples, but is not limited thereto. In the examples, "parts" and "%" show "parts by mass" and "% by mass", respectively, unless otherwise specified.

In the examples, particle materials used in the examples were placed in a dryer and dried under vacuum pressure, liquid materials were placed in a molecular sieve to remove moisture under vacuum pressure, and display devices were prepared in a globe box.

Example 1

The display devices were prepared and evaluated as follows.
<<Preparation of Electrodes>>
(Preparation of Electrode 1)

A commercially available glass with an ITO film (with a glass thickness of 1.5 mm) was etched according to a conventional method to form an electrode with a width of 130 μm at a pitch of 145 μm. Thus, an electrode 1 was prepared.
(Preparation of Electrode 2)

A silver-palladium electrode with a thickness of 0.8 μm and a width of 130 μm was formed at a pitch of 145 μm on a 10 cm×10 cm glass plate with a thickness of 1.5 mm, employing a conventional method. Thus, an electrode 2 was prepared.
(Preparation of Electrode 3)

A titanium dioxide dispersion solution (Ti-Nanoxide HT/SP, produced by Solaronix Co., Ltd) was screen printed on the Electrode 2 obtained above, and baked at 120° C. in an oven to form a titanium dioxide layer with a thickness of about 5 μm. Thus, an electrode 3 was prepared.
(Preparation of Electrode 4)

A polyethylene terephthalate film (with a thickness of 150 μm) having on the surface an ITO film with a width of 130 μm at a pitch of 145 μm was provided as an electrode 4.
(Preparation of Electrode 5)

A silver-palladium electrode with a thickness of 0.8 μm and a width of 130 μm was formed at a pitch of 145 μm on a polyethylene carbonate film with a thickness of 150 μm. Thus, an electrode 5 was prepared.
(Preparation of Electrode 6)

A titanium dioxide dispersion solution (Ti-Nanoxide HT/SP, produced by Solaronix Co., Ltd) was screen printed on the Electrode 5 obtained above, and baked at 120° C. in an oven to form a titanium dioxide layer with a thickness of about 5 μm. Thus, an electrode 6 was prepared.
(Preparation of Electrode 7)

A tin oxide layer with a thickness of 5 μm was formed on the electrode 1 obtained above. Thus, an electrode 7 was prepared.
(Preparation of Electrode 8)

A tin oxide layer with a thickness of 5 μm was formed on the electrode 4 obtained above. Thus, an electrode 8 was prepared.
<<Preparation of Display Device>>
Preparation of Display Device 1 (Comparative)

Lithium perchlorate of 0.05 parts by mass and 0.2 parts by mass of Compound (L1) as an electrochromic compound were added to 5 parts by mass of propylene carbonate and dissolved. Then, 0.1 parts by mass of polyethylene glycol (having an average molecular weight of 500,000) as a viscosity increasing agent were added to the resulting solution and dissolved while heating to prepare an electrolyte composition 1.

Subsequently, an epoxy-based sealing agent was provided on the periphery of the electrode 3 to give a height of about 30 μm to form a box. The box was charged with the electrolyte composition 1 obtained above, and then covered with the electrode 1, followed by curing the epoxy-based sealing agent. Thus, a display device 1 was prepared.

Preparation of Display Device 2 (Comparative)

A display device 2 was prepared in the same manner as in the display device 1, except that the electrolyte composition 1 was changed to the following electrolyte composition 2.

<Preparation of Electrolyte Composition 2>

An electrolyte composition 2 was prepared in the same manner as in the electrolyte composition 1 above, except that 0.2 parts by mass of Compound O-1 as a gelling agent were used instead of 0.1 parts by mass of polyethylene glycol.

Preparation of Display Device 3 (Comparative)

A display device 3 was prepared in the same manner as in the display device 2, except that the electrolyte composition 2 was changed to the following electrolyte composition 3.

<Preparation of Electrolyte Composition 3>

An electrolyte composition 3 was prepared in the same manner as in the electrolyte composition 2 above, except that 0.27 parts by mass of Compound O-2 as a gelling agent were used instead of 0.2 parts by mass of Compound O-1.

Preparation of Display Device 4 (Comparative)

<Preparation of Electrolyte Composition 4>

An electrolyte composition 4 was prepared in the same manner as in the electrolyte composition 2 above, except that 0.27 parts by mass of Compound O-3 as a gelling agent were used instead of 0.2 parts by mass of Compound O-1.

<Preparation of Display Device>

An epoxy-based sealing agent was provided on the periphery of the electrode 6 to give a height of about 30 μm to form a box. The box was charged with the electrolyte composition 4 obtained above, and then covered with the electrode 4, followed by curing the epoxy-based sealing agent. Thus, a display device 4 was prepared.

Preparation of Display Device 5 (Inventive)

EC Compound 1 as an electrochromic compound of 0.4 parts by mass, 0.04 parts by mass of 2,5-di-tert-amylquinone, 0.035 parts by mass of triphenyl antimony and 0.04 parts by mass of $(n-C_4H_9)_4NBF_4$ were added to 1.0 part by mass of N,N-dimethylacetamide and dissolved. Then, 0.04 parts by mass of compound 17-1 were added to the resulting solution to prepare an electrolyte composition 5.

A display device 5 was prepared in the same manner as in the display device 1, except that the electrolyte composition 5 above was used instead of the electrolyte composition 1.

Preparation of Display Device 6 (Inventive)

A display device 6 was prepared in the same manner as in the display device 5, except that the electrolyte composition 5 was changed to the following electrolyte composition 6.

<Preparation of Electrolyte Composition 6>

An electrolyte composition 6 was prepared in the same manner as in the electrolyte composition 5 above, except that Compound 20-1 as a gelling agent was used instead of Compound 17-1.

Preparation of Display Device 7 (Inventive)

A display device 7 was prepared in the same manner as in the display device 5, except that the electrolyte composition 5 was changed to the following electrolyte composition 7.

<Preparation of Electrolyte Composition 7>

An electrolyte composition 7 was prepared in the same manner as in the electrolyte composition 5 above, except that 0.05 parts by mass of Compound 10-3 as a gelling agent was used instead of 0.04 parts by mass of Compound 17-1.

Preparation of Display Device 8 (Inventive)

A display device 8 was prepared in the same manner as in the display device 7, except that the electrolyte composition 7 was changed to the following electrolyte composition 8.

<Preparation of Electrolyte Composition 8>

An electrolyte composition 8 was prepared in the same manner as in the electrolyte composition 7 above, except that Compound 7-3 as a gelling agent was used instead of Compound 10-3.

Preparation of Display Device 9 (Inventive)

The electrode 7 was immersed in a 5 millimole/liter aqueous solution of EC Compound 2 as an electrochromic compound for 24 hours so that the EC Compound 2 was adsorbed onto the electrode.

Lithium perchlorate of 0.1 mole/liter was dissolved in γ-butyrolactone and added with 25 g/liter of Compound 12-3 as a gelling agent. Thus, an electrolyte composition 9 was prepared.

Subsequently, an epoxy-based sealing agent was provided on the periphery of the electrode 7 with EC Compound 2 adsorbed to give a height of about 30 μm to form a box. The box was charged with the electrolyte composition 9 obtained above, and then covered with the electrode 2, followed by curing the epoxy-based sealing agent. Thus, a display device 9 was prepared.

Preparation of Display Device 10 (Inventive)

A display device 10 was prepared in the same manner as in the display device 9, except that the electrolyte composition 9 was changed to the following electrolyte composition 10.

<Preparation of Electrolyte Composition 10>

An electrolyte composition 10 was prepared in the same manner as in the electrolyte composition 9 above, except that Compound 7-1 as a gelling agent was used instead of Compound 12-3.

Preparation of Display Device 11 (Inventive)

A display device 11 was prepared in the same manner as in the display device 10, except that the electrolyte composition 10 was changed to the following electrolyte composition 11.

<Preparation of Electrolyte Composition 11>

An electrolyte composition 11 was prepared in the same manner as in the electrolyte composition 10 above, except that Compound 1-1 as a gelling agent was used instead of Compound 7-1.

Preparation of Display Device 12 (Inventive)

A display device 12 was prepared in the same manner as in the display device 11, except that the electrolyte composition 11 was changed to the following electrolyte composition 12.

<Preparation of Electrolyte Composition 12>

An electrolyte composition 12 was prepared in the same manner as in the electrolyte composition 11 above, except that 30 g/liter of Compound 7-4 as a gelling agent was used instead of 25 g/liter of Compound 1-1.

Preparation of Display Device 13 (Inventive)

The electrode 7 was immersed in a mixture solution of methanol and isopropanol containing $O_2$ mole/liter of EC Compound 3 as an electrochromic compound so that the EC Compound 3 was adsorbed onto the electrode surface.

Compound 2-1 of 0.2 parts by mass were added as a gelling agent to 5 parts by mass of a 0.05 parts by mass tetrabutylammonium chloride dimethylsulfoxide solution. Thus, an electrolyte composition 13 was prepared.

Subsequently, a display device 13 was prepared in the same manner as in display device 9, except that the electrode 7 with EC Compound 3 adsorbed was used instead of the electrode 7 with EC Compound 2 adsorbed, and the electrolyte composition 13 was provided between the electrode 7 with EC Compound 3 adsorbed and the electrode 2.

Preparation of Display Device 14 (Inventive)

A display device 14 was prepared in the same manner as in the display device 13, except that the electrolyte composition 13 was changed to the following electrolyte composition 14.

<Preparation of Electrolyte Composition 14>

An electrolyte composition 14 was prepared in the same manner as in the electrolyte composition 13 above, except that Compound 10-3 as a gelling agent was used instead of Compound 2-1.

Preparation of Display Device 15 (Inventive)

An electrolyte composition 15 was prepared in the same manner as in the electrolyte composition 14 above, except that Compound 7-3 as a gelling agent was used instead of Compound 10-3.

The electrode 6 was immersed in a mixture solution of methanol and isopropanol containing 0.2 mole/liter of EC Compound 3 as an electrochromic compound so that the EC Compound 3 was adsorbed onto the electrode surface.

Subsequently, a display device 14 was prepared in the same manner as in display device 9, except that the electrode 6 with EC Compound 3 adsorbed and the electrode 5 were used instead of the electrode 7 with EC Compound 2 adsorbed and the electrode 2, and the electrolyte composition 15 was provided between the electrode 6 with EC Compound 3 adsorbed and the electrode 5.

Preparation of Display Device 16 (Inventive)

Spiro-(1,1')bipyrrolidinium tetrafluoroborate of 0.05 parts by mass, 0.2 parts by mass of Compound (7-1) as a gelling agent and 0.2 parts by Mass of Compound (7-2) were added to 5.0 parts by mass of N,N-diethyl-N-methyl-N-2-dimethoxyethylammonium tetrafluoroborate to prepare an electrolyte composition 16.

Subsequently, the electrode 7 was immersed in a mixture solution of methanol and isopropanol containing 0.2 mole/liter of Compound (L1) as an electrochromic compound so that the Compound (L1) was adsorbed onto the electrode surface.

A display device 16 was prepared in the same manner as in the display device 1, except that this electrode 7 with Compound (L1) absorbed was used instead of the electrode 3, and the electrolyte composition 16 was provided between the electrode 7 with Compound (L1) absorbed and the electrode 1.

Preparation of Display Device 17 (inventive)

Compound (L1) as electrochromic compound of 0.8 parts by mass, 030 parts by mass of triphenyl phosphine, 0.05 parts by mass of tetrabutylammonium perchlorate, 0.30 parts by mass of silver p-toluene sulfonate, and 0.4 parts by mass of Compound (G1-13) were added to 5.0 parts by mass of dimethylsulfoxide, and dissolved while heating. Subsequently, 1 part by mass of polyethylene glycol (with an average molecular weight of 500000) and one part by mass of Compound 7-1 as a gelling agent were added to the resulting solution, heated and dissolved. Thereafter, 2.5 parts by mass of titanium dioxide (with an average particle diameter of 0.25 µm) were added thereto and dispersed to prepare an electrolyte composition 17.

Subsequently, a display device 17 was prepared in the same manner as in display device 1 above, except that the electrode 2 was used instead of the electrode 3, and the electrolyte composition 17 was provided between the electrodes 1 and 2.

Preparation of Display Device 18 (Inventive)

According to a conventional method, Compound S-1, a gelling agent having a siloxane bond, $TiO_2$ particles (with an average particle diameter of 25 nm), and water/ethanol were mixed and stirred for one hour while heating at 85° C. to obtain modified $TiO_2$ particles 1 in which Compound S-1 was combined with the $TiO_2$ particles through the a siloxane bond.

Subsequently, 0.8 parts by mass of Compound (L1) as electrochromic compound, 0.30 parts by mass of triphenyl phosphine, 0.05 parts by mass of tetrabutylammonium perchlorate, 0.3 parts by mass of silver p-toluene sulfonate, and 0.4 parts by mass of Compound (G1-13) were added to 5.0 parts by mass of dimethylsulfoxide, and dissolved while heating. Further, 3 parts by mass of the modified $TiO_2$ particles 1 were added to the resulting solution and dispersed to prepare an electrolyte composition 18.

Subsequently, a display device 18 was prepared in the same manner as in display device 1 above, except that the electrodes 4 and 5 were used instead of the electrodes 1 and 3, and the electrolyte composition 18 was provided between the electrodes 4 and 5.

Preparation of Display Device 19 (Inventive)

Modified $TiO_2$ particles 2 were prepared in the same manner as in Modified $TiO_2$ particles 1, except that Compound S-2, a gelling agent having a siloxane bond was used instead of Compound S-1, a gelling agent having a siloxane bond.

Subsequently, 0.8 parts by mass of Compound (L1) as electrochromic compound, 0.05 parts by mass of spiro-(1,1')-bipyrrolidinium tetrafluoroborate, 0.3 parts by mass of silver p-toluene sulfonate, 0.2 parts by mass of Compound (3-1) as a gelling agent and 0.4 parts by mass of Compound (G2-20) as a silver salt solvent were added to 5.0 parts by mass of dimethylsulfoxide, and dissolved. Further, 3 parts by mass of the modified $TiO_2$ particles 2 were added to the resulting solution and dispersed to prepare an electrolyte composition 19.

Subsequently, a display device 19 was prepared in the same manner as in display device 18 above, except that the electrolyte composition 19 was provided between the electrodes 4 and 5.

With respect to compounds used in each display device, the chemical structures of compounds other than the compounds exemplified previously will be shown below.

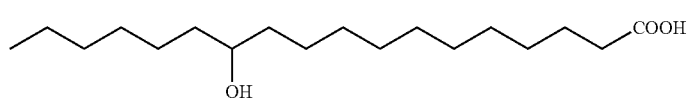

Compound O-1

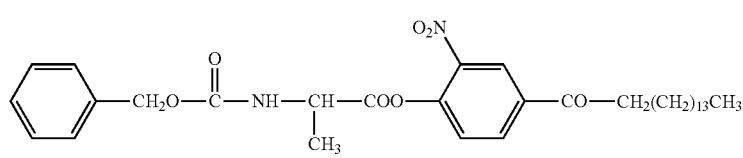

Compound O-2

Compound O-3

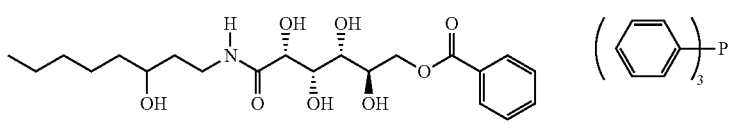

EC Compound 1

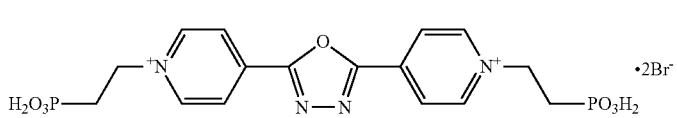

EC Compound 2

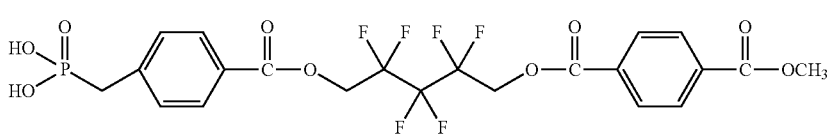

EC Compound 3

Compound S-1

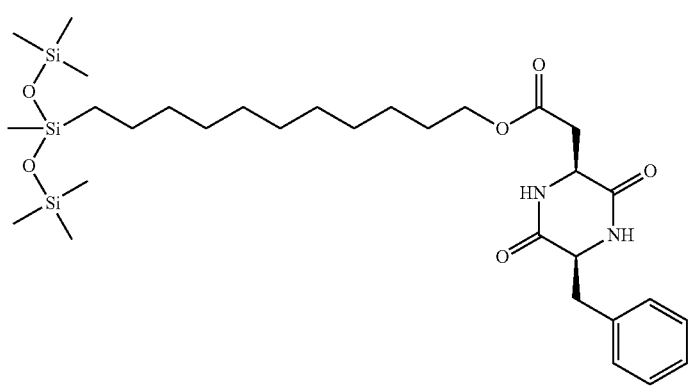

Compound S-2

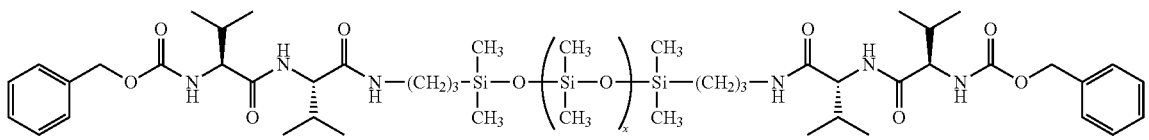

<<Evaluation of Display Device>>
[Evaluation of Mechanical Strength]

Employing TENSILON TRC-1150A produced by ORIENTIC Co., Ltd., and an attachment device (a pair of compression plates) produced by ARAI SEISAKUSHO Co., Ltd., a compression load was applied to the both sides (substrate sides) of each of the resulting display devices prepared above and the load at which fracture occurred was determined.

Each of the resulting display devices was allowed to stand for 12 hours at 25° C. and at 60% RH, provided between the pair of compression plates described above and compressed at 25° C. and at 60% RH in a compression direction in a compression speed of 0.5 mm/minute, while a compression load applied to the sample is monitored. Then, the compression (minimum) load at which fracture occurred was measured.

The mechanical strength was evaluated according to the following criteria
A: Fracture occurred at a compression load of 0.6 MPa or more.
B: Fracture occurred at a compression load of from 0.4 MPa to less than 0.6 MPa,
C: Fracture occurred at a compression load of from 0.2 MPa to less than 0.4 MPa.
D: Fracture occurred at a compression load of less than 0.2 MPa

[Evaluation of Reaction Speed]
(Preparation of Reference Display Devices)
<Preparation of Reference Display Devices A through D to be compared to Display Devices 1 through 4>

Reference Display Devices A through D were prepared in the same manner as in Display Devices 1 through 4, respectively, except that the viscosity increasing agent or the gelling agent was removed from each of the electrolyte compositions used in Display Devices 1 through 4.
<Preparation of Reference Display Device E to be compared to Display Devices 5 through 8>

Reference Display Device E was prepared in the same manner as in Display Device 5, except that Compound 17-1 as a gelling agent was removed from the electrolyte composition 5 used.
<Preparation of Reference Display Device F to be compared to Display Devices 9 through 12>

Reference Display Device F was prepared in the same manner as in Display Device 9, except that Compound 12-3 as a gelling agent was removed from the electrolyte composition 9 used.
<Preparation of Reference Display Device G to be compared to Display Devices 13 through 15>

Reference Display Device G was prepared in the same manner as in Display Device 13, except that Compound 2-1 as a gelling agent was removed from the electrolyte composition 13 used.

<Preparation of Reference Display Devices H through K to be compared to Display Devices 16 through 19>

Reference Display Devices H through K were prepared in the same manner as in Display Devices 16 through 19, respectively, except that the gelling agent was removed from each of the electrolyte compositions used in Display Devices 16 through 19.

(Evaluation)

Reaction time taken to reach a contrast of 5 after a voltage of 1.5 V was applied to each display device or each reference display device was determined, and reaction time variation rate (%) of each display device to each reference display device, which is represented by the following formula, was calculated, and evaluated as a measure of reaction speed.

Reaction Time Variation Rate (%)=[(Reaction Time of Reference Display Device)−(Reaction Time of Display Device)×100(%)]/Reaction Time of Reference Display Device

[Evaluation of Moisture Resistance 1]

Display device samples for test were prepared in the same manner as in each of the display devices prepared above, provided that each of the electrolyte compositions was prepared so as to have a moisture content of 50 ppm, 100 ppm, 500 ppm, 1000 ppm and 2500 ppm. Reaction time taken to reach a contrast of 5 after a voltage of 1.5 V was applied to each of the display device samples for test was determined. The moisture content of the display device sample for test whose reaction time was twice that of the original display device having no moisture content was determined and evaluated as a measure of moisture resistance 1. The higher the moisture content is, the higher the moisture resistance.

The results are shown in Table 1.

TABLE 1

| Display Device No. | Mechanical Strength | Reaction Speed (%) | Moisture Resistance 1 (ppm) | Remarks |
|---|---|---|---|---|
| 1 | D | −75 | * | Comp. |
| 2 | D | −70 | * | Comp. |
| 3 | C | −55 | 50 | Comp. |
| 4 | C | −50 | * | Comp. |
| 5 | B | −20 | 500 | Inv. |
| 6 | B | −15 | 1000 | Inv. |
| 7 | B | −2 | 2500 or more | Inv. |
| 8 | B | −10 | 1000 | Inv. |
| 9 | B | −9 | 500 | Inv. |
| 10 | B | −3 | 2500 or more | Inv. |
| 11 | B | −11 | 1000 | Inv. |
| 12 | B | −12 | 500 | Inv. |
| 13 | B | −16 | 500 | Inv. |
| 14 | B | −10 | 1000 | Inv. |
| 15 | B | −2 | 2500 or more | Inv. |
| 16 | A | −0 | 1000 | Inv. |
| 17 | A | −1 | 2500 or more | Inv. |
| 18 | A | −5 | 2500 or more | Inv. |
| 19 | A | −6 | 2500 or more | Inv. |

Comp.: Comparative,
Inv.: Inventive
* The display devices did not work.

As is apparent from Table 1, the inventive display devices employing the gelling agent in the invention exhibit high mechanical strength and high moisture resistance and minimize reaction speed lowering, as compared with the comparative display devices.

Example 2

A secondary battery was prepared and evaluated according to the following procedures.

<<Preparation of Secondary Battery>>

[Preparation of Secondary battery 1 (Comparative)]

(Preparation of Positive Electrode Sheet)

A mixture of 43 g of $LiCoO_2$ as a positive electrode active material, 2.0 g of scale-like graphite, 2.0 g of acetylene black, and 3.0 g of polyacrylonitrile was added to 100 g of acrylonitrile as a medium, and kneaded with to obtain a slurry. The slurry was coated on a 20 μm thick aluminum foil employing an extrusion coater, dried and compression-molded with a calendar pressing machine. Subsequently, a lead plate made of aluminum was welded at the end of the resulting mold to prepare a positive electrode sheet having a thickness of 95 μm, a width of 54 mm and a length of 49 mm. The resulting sheet was dehydration dried at 230° C. for 30 minutes in dry air with a dew point of −40° C.

(Preparation of Electrolyte Composition D1)

A mixture of 3.2 g of 1-ethyl-3-methylimidazolium bis(fluorosulfonyl)imide (EMIFSI) and 0.29 g of $LiN(CF_3SO_2)_2$ was ground in a mortar in an argon-filled glove.

Further, 1.6 g of magnesium oxide particles (with an average particle diameter of 15 nm) were added in the mortar and mixed. Subsequently, 0.1 g of polyethylene glycol (with an average molecular weight of 500,000) were added to the resulting mixture to prepare Electrolyte Composition D1.

(Preparation of Secondary Battery)

The Electrolyte Composition D1 obtained above was diluted with N-methylpyrrolidone (NMP). The diluted Electrolyte Composition D1 was coated on a positive electrode sheet having a width of 54 mm and a length of 49 mm, which has been dehydration dried in a dry box, and dried at 80° C. under vacuum pressure to form a 20 μm thick layer. Subsequently, Celgard 2400 (with a thickness of 25 μm and a porosity of 37%) was laminated onto the resulting layer to four a separator and a gel prepared by adding NMP to the Electrolyte Composition D1 to lower the viscosity was coated on the separator with a wire bar, and dried at 80° C. under vacuum pressure to form a layer with a thickness of 20 μm. Thereafter, a negative electrode sheet (a lithium film-laminated copper foil (with a lithium film thickness of 30 μm and a copper foil thickness of 20 μm)) with a width of 55 mm and a length of 50 mm, in which the above-described lead plate was welded, was laminated onto the layer, and heated under reduced pressure at 80° C. for 3 hours. Thereafter, the resulting laminate was packaged in an enclosure formed from a laminate film of polyethylene (with a thickness of 50 μm) and polyethylene terephthalate (with a thickness of 50 μm) and the four edges of the enclosure were heat-fused under vacuum for sealing to prepare Secondary battery 1 in the form of a sheet.

[Preparation of Secondary Battery 2 (Inventive)]

Secondary Battery 2 was prepared in the same manner as in Secondary Battery 1 above, except that the following Electrolyte Composition D2 was used instead of Electrolyte Composition D1.

(Preparation of Electrolyte Composition D2)

Electrolyte Composition D2 was prepared in the same manner as in Electrolyte Composition D1 above, except that Compound 17-1 as a gelling agent was used instead of polyethylene glycol.

[Preparation of Secondary Battery 3 (Inventive)]

Secondary Battery 3 was prepared in the same manner as in Secondary Battery 2 above, except that the following Electrolyte Composition D3 was used instead of Electrolyte Composition D2.

(Preparation of Electrolyte Composition D3)

Electrolyte Composition D3 was prepared in the same manner as in Electrolyte Composition D2 above, except that Compound 20-1 as a gelling agent was used instead of Compound 17-1.

[Preparation of Secondary Battery 4 (Inventive)]

Secondary Battery 4 was prepared in the same manner as in Secondary Battery 2 above, except that the following Electrolyte Composition D4 was used instead of Electrolyte Composition D2.

(Preparation of Electrolyte Composition D4)

Electrolyte Composition D4 was prepared in the same manner as in Electrolyte Composition D2 above, except that Compound 7-1 as a gelling agent was used instead of Compound 17-1.

[Preparation of Secondary Battery 5 (Inventive)]

Secondary Battery 5 was prepared in the same manner as in Secondary Battery 2 above, except that the following Electrolyte Composition D5 was used instead of Electrolyte Composition D2.

(Preparation of Electrolyte Composition D5)

Electrolyte Composition D5 was prepared in the same manner as in Electrolyte Composition D2 above, except that $SiO_2$—MgO particles (with an average particle diameter of 15 nm) was added instead of magnesium oxide particles (with an average particle diameter of 15 nm) and Compound 7-2 as a gelling agent was used instead of Compound 17-1.

[Preparation of Secondary Battery 6 (Inventive)]

Secondary Battery 6 was prepared in the same manner as in Secondary Battery 2 above, except that the following Electrolyte Composition D6 was used instead of Electrolyte Composition D2.

(Preparation of Electrolyte Composition D6)

According to a conventional method, Compound S-1 (described previously), a gelling agent having a siloxane bond, $SiO_2$—MgO particles (with an average particle diameter of 26 nm), and water/ethanol were mixed and stirred for one hour while heating at 85° C. to obtain modified $SiO_2$—MgO particles in which Compound S-1 was combined with the $SiO_2$—MgO particles through the a siloxane bond.

Electrolyte Composition D6 was prepared in the same manner as in Electrolyte Composition D5 above, except that the $SiO_2$—MgO particles were changed to the modified $SiO_2$—MgO particles above and further, the gelling agent was removed.

[Preparation of Secondary Battery 7 (Inventive)]

Secondary Battery 7 was prepared in the same manner as in Secondary Battery 6 above, except that the following Electrolyte Composition D7 was used instead of Electrolyte Composition D6.

(Preparation of Electrolyte Composition D7)

Electrolyte Composition D7 was prepared in the same manner as in Electrolyte Composition D6 above, except that Compound S-2 (described previously), a gelling agent having a siloxane bond was used instead of Compound S-1.

<<Evaluation of Secondary Battery>>

[Evaluation of Mechanical Strength]

A compression load was applied to the both sides (substrate sides) of each of the resulting secondary batteries prepare in the same manner as in Example 1 above, and the load at which fracture occurred was determined and the mechanical strength of the secondary battery was evaluated according to the following criteria.

A: Fracture occurred at a compression load of 0.6 MPa or more.
B: Fracture occurred at a compression load of from 0.4 MPa to less than 0.6 MPa.
C: Fracture occurred at a compression load of from 0.2 MPa to less than 0.4 MPa.
D: Fracture occurred at a compression load of less than 0.2 MPa (Ion Conductivity)

Ion conductivity of each of the resulting secondary batteries prepared above was measured and evaluated according to the following criteria.

(Measurement of Ion Conductivity)

Alternating current impedance of each secondary battery was measured at 25° C., employing a measurement holder as shown in FIG. 1, and the ion conductivity was determined from the impedance intercept. A secondary battery sample 1 with a given size was prepared from each secondary battery obtained above in an argon atmosphere, and provided between —stainless steel electrodes 2 and 3. The resulting sample was put in a stainless steel holder 4 with a hole for inserting an electrode, and covered with a Teflon ® cover 6 with a spring 5. Then, pressure was applied to the electrode 3 through the spring 5, and screws 7 and 8 electrically connecting to the electrodes 2 and 3 were connected to the lead wire, whereby alternating current impedance was measured.

(Evaluation Criteria)

A: Ion conductivity was $5 \times 10^{-3}$ S/cm or more
B: Ion conductivity was in the range of from $5 \times 10^{-5}$ to less than $5 \times 10^{-3}$ S/cm.
C: Ion conductivity was in the range of from $5 \times 10^{-7}$ to less than $5 \times 10^{-5}$ S/cm.
D: Ion conductivity was less than $5 \times 10^{-7}$ S/cm.

[Moisture Resistance 2]

Secondary battery samples, comprising an electrolyte composition containing moisture, were prepared in the same manner as the secondary batteries obtained above, except that each of the electrolyte compositions was prepared so as to have a moisture content of 50 ppm, 100 ppm, 500 ppm, 1000 ppm and 2500 ppm. Change in electrical capacitance due to 100% DOD charge/discharge cycle was determined. When the initial electrical capacitance was set at 100%, the cycle number at which the electrical capacitance was lower than 85% was determined as a measure of moisture resistance 2.

The less the decrease in the cycle number due to moisture content is, the higher the moisture resistance 2.

The results are shown in Table 2.

TABLE 2

| Secondary Battery No. | Mechanical Strength | Ion Conductivity | Moisture Resistance 2 (Cycle Number at each Moisture Content) | | | | | | Remarks |
|---|---|---|---|---|---|---|---|---|---|
| | | | 0 ppm | 50 ppm | 100 ppm | 500 ppm | 1000 ppm | 2500 ppm | |
| 1 | D | D | 210 | 85 | — | — | — | — | Comp. |
| 2 | B | B | 315 | 300 | 275 | 275 | 265 | 250 | Inv. |
| 3 | B | A | 330 | 312 | 290 | 290 | 278 | 262 | Inv. |
| 4 | B | A | 350 | 330 | 302 | 302 | 290 | 282 | Inv. |
| 5 | B | A | 362 | 349 | 330 | 330 | 321 | 310 | Inv. |

TABLE 2-continued

| Secondary Battery No. | Mechanical Strength | Ion Conductivity | Moisture Resistance 2 (Cycle Number at each Moisture Content) | | | | | | Remarks |
|---|---|---|---|---|---|---|---|---|---|
| | | | 0 ppm | 50 ppm | 100 ppm | 500 ppm | 1000 ppm | 2500 ppm | |
| 6 | A | A | 378 | 367 | 350 | 350 | 339 | 326 | Inv. |
| 7 | A | A | 385 | 378 | 359 | 359 | 348 | 335 | Inv. |

Comp.: Comparative,
Inv.: Inventive

As is apparent from Table 2, the inventive secondary batteries employing the gelling agent in the invention exhibit high mechanical strength, high ion conductivity and excellent moisture resistance as compared with the comparative secondary batteries.

As is apparent from the above evaluation results, use of the gelling agent in the invention having in the chemical structure two or more amido groups can secure a high electrolyte composition layer strength without preventing migration in the electrolyte composition of electrons or ions, namely, without markedly minimizing lowering of electrochemical reaction speed. Further, it has proved that use of the gelling agent in the invention having in the chemical structure two or more amido groups improves moisture resistance of the electrochemical device.

Addition of fillers in the electrolyte composition provides higher electrolyte composition layer strength.

Further, it has proved that use of a compound capable of combining with the filler surface as a gelling agent is more effective.

What is claimed is:

1. An electrochemical device comprising a pair of electrodes and provided therebetween, a gelled nonaqueous electrolyte composition containing an electrolyte and a gelling agent having two or more amide groups in the chemical structure, wherein the gelling agent is a compound represented by formula (A), (B) or (C):

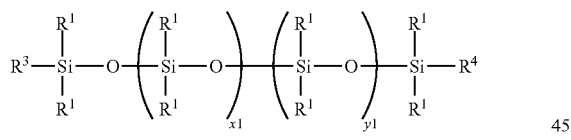

Formula (A)

wherein plural $R^1$s independently represent a straight chained alkoxy group having a carbon atom number of from 1 to 12 a substituted or unsubstituted alkyl group having a carbon atom number of from 1 to 18, an aralkyl group having a carbon atom number of from 7 to 21 or a substituted or unsubstituted aryl group having a carbon atom number of from 6 to 20; and $R^2$ represents an amino acid derivative segment represented by the following formula (D),

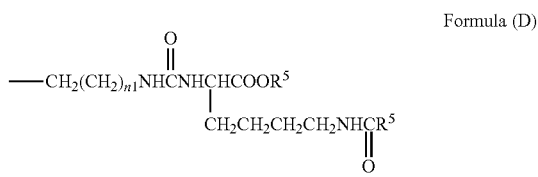

Formula (D)

wherein n1 represents an integer of from 1 to 15, and plural $R^5$s independently represent a substituted or unsubstituted alkyl group having a carbon atom number of from 1 to 22; $R^3$ and $R^4$ represent the same as those denoted above in any of $R^1$s and $R^2$; x1 represents an integer of from 0 to 500; and y1 represents an integer of from 0 to 400, provided that when y1 is 0, at least one of $R^3$ and $R^4$ represents the amino acid derivative segment represented by formula (D) above,

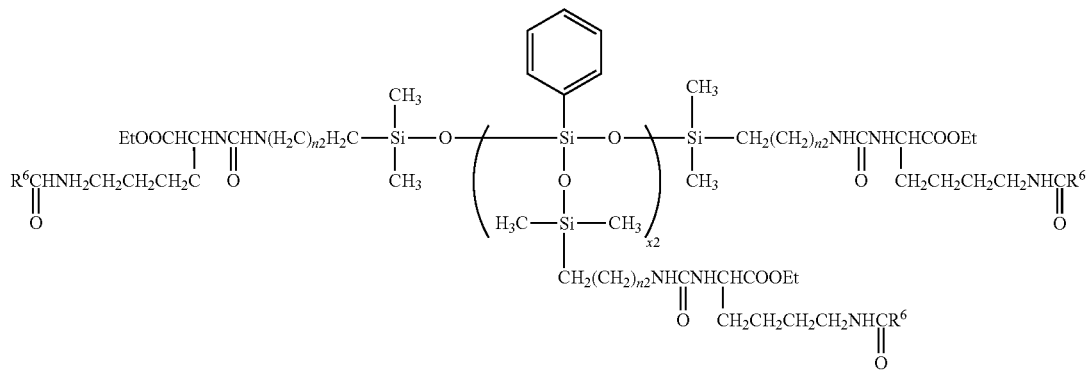

Formula (B)

wherein plural $R^6$s independently represent a substituted or unsubstituted alkyl group having a carbon atom number of from 1 to 22; x2 represents an integer of from 1 to 500; and n2 represents an integer of from 1 to 15,

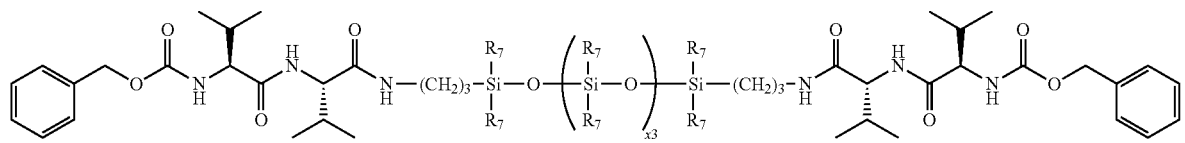

Formula (C)

wherein plural $R^7$s independently represent a straight chained alkoxy group having a carbon atom number of from 1 to 22 a substituted or unsubstituted alkyl group having a carbon atom number of from 1 to 18, an aralkyl group having a carbon atom number of from 7 to 21 or a substituted or unsubstituted aryl group having a carbon atom number of from 6 to 20; and x3 represents an integer of from 0 to 500.

2. The electrochemical device of claim 1, wherein the gelled nonaqueous electrolyte composition further contains an ionic liquid.

3. The electrochemical device of claim 1, wherein the gelled nonaqueous electrolyte composition further contains fillers.

4. The electrochemical device of claim 3, wherein the fillers are basic inorganic particles.

5. The electrochemical device of claim 1, wherein the electrochemical device is employed as a display device.

6. The electrochemical device of claim 1, wherein the electrochemical device is employed as a secondary battery.

* * * * *